(12) United States Patent
Mehta et al.

(10) Patent No.: US 10,037,128 B2
(45) Date of Patent: Jul. 31, 2018

(54) OPERATING BEHAVIOR CLASSIFICATION INTERFACE

(71) Applicant: Falkonry Inc., Santa Clara, CA (US)

(72) Inventors: Nikunj R. Mehta, Cupertino, CA (US); Prasanta Bose, Sunnyvale, CA (US)

(73) Assignee: Falkonry, Inc., Santa Clara, CA (US)

( * ) Notice: Subject to any disclaimer, the term of this patent is extended or adjusted under 35 U.S.C. 154(b) by 783 days.

(21) Appl. No.: 14/172,816

(22) Filed: Feb. 4, 2014

(65) Prior Publication Data

US 2015/0222495 A1 Aug. 6, 2015

(51) Int. Cl.
G06F 3/0484 (2013.01)
G05B 23/02 (2006.01)

(52) U.S. Cl.
CPC ....... *G06F 3/0484* (2013.01); *G05B 23/0272* (2013.01)

(58) Field of Classification Search
CPC .... G06F 3/0484; G05B 23/0272; H04L 41/22
USPC .......................................................... 715/736
See application file for complete search history.

(56) References Cited

U.S. PATENT DOCUMENTS

| | | | |
|---|---|---|---|
| 5,764,509 A | 6/1998 | Gross | |
| 6,199,018 B1 | 3/2001 | Quist | |
| 6,519,575 B1 * | 2/2003 | Goebel | G06K 9/628 382/159 |
| 6,757,668 B1 * | 6/2004 | Goebel | G06K 9/6292 706/47 |
| 7,233,886 B2 | 6/2007 | Wegerich | |
| 7,308,385 B2 | 12/2007 | Wegerich | |
| 8,036,999 B2 | 10/2011 | Akhrarov | |
| 2002/0103626 A1 | 8/2002 | Zhao et al. | |
| 2004/0172177 A1 * | 9/2004 | Nagai | G07C 5/085 701/33.4 |
| 2007/0028219 A1 | 2/2007 | Miller | |
| 2007/0028220 A1 | 2/2007 | Miller | |
| 2008/0027678 A1 | 1/2008 | Miller | |
| 2008/0103996 A1 * | 5/2008 | Forman | G06N 99/005 706/12 |

(Continued)

FOREIGN PATENT DOCUMENTS

EP 2323105 A1 * 5/2011 ............... G07C 3/08

OTHER PUBLICATIONS

The International Searhcing Authority, "Search Report" in application No. PCT/US2014/067690, dated Feb. 27, 2015, 12 pages.

(Continued)

*Primary Examiner* — John Repsher, III
(74) *Attorney, Agent, or Firm* — Hickman Palermo Becker Bingham LLP

(57) ABSTRACT

A method and apparatus for generating, causing display of, sending, or otherwise providing one or more interfaces for monitoring machines, classifying operating behavior of the machines, and/or predicting operational behavior of the machines. The interfaces may include a graphical user interface that that shows graphical elements changing in appearance over time according to a sequence of stored values that represent measurements. An interface manager may receive, via the graphical user interface, input comprising a label, and, based at least in part on the input, store the label in association with the displayed sequence or in association with a set or cluster of sequences that includes the displayed sequence.

20 Claims, 14 Drawing Sheets

(56) References Cited

U.S. PATENT DOCUMENTS

| | | |
|---|---|---|
| 2008/0271057 A1 | 10/2008 | Bates |
| 2009/0037772 A1 | 2/2009 | Wegerich et al. |
| 2009/0092299 A1* | 4/2009 | Jerebko .............. G06K 9/622 382/128 |
| 2010/0114806 A1 | 5/2010 | Harrison et al. |
| 2012/0075103 A1* | 3/2012 | Powell .............. G06F 19/3418 340/573.1 |
| 2013/0019125 A1 | 1/2013 | Almubarak |
| 2013/0238619 A1* | 9/2013 | Hanaoka .......... G06F 17/30551 707/736 |
| 2013/0294560 A1* | 11/2013 | Graham .............. G21C 17/00 376/216 |
| 2014/0052349 A1* | 2/2014 | Tsukane ............... E02F 9/267 701/50 |
| 2015/0026622 A1* | 1/2015 | Roaldson ............ G06F 3/0484 715/771 |
| 2015/0149134 A1 | 5/2015 | Mehta et al. |
| 2015/0169190 A1* | 6/2015 | Girardeau .......... G06F 3/04842 715/771 |

OTHER PUBLICATIONS

Claims in application No. PCT/US2014/067690, dated Feb. 2015, 5 pages.

P. Ribot, Generic characterization of diagnosis and prognosis for complex heterogeneous systems, Int'l J of Prognostics & Health Management, United States, 2013, 18 pages.

J. Sen Gupta et al., Characterization of prognosis methods: an industrial approach, European Conf of the Prognostics and Health Management Society, 2012, published in United States, 9 pages.

J. Courrech et al., Condition Monitoring of Machinery, chapter 16 of Harris' Shock and Vibration Handbook, McGraw-Hill, New York, 2002.

A. Saxena, "Prognostics: The Science of Prediction," Annual Conf of PHM Society PHM 2010, Oct. 10, 2010, published by Prognostics Center of Excellence, United States, 70 pages.

U.S. Appl. No. 14/092,737, filed Nov. 27, 2013, dated May 6, 2016.

Metha, U.S. Appl. No. 14/092,737, filed Nov. 27, 2013, dated Sep. 28, 2017.

Metha, U.S. Appl. No. 14/092,737, filed Nov. 27, 2013, Office Action, dated Jun. 29, 2017.

* cited by examiner

OPERATING BEHAVIOR CLASSIFICATION INTERFACE

TECHNICAL FIELD

The disclosure generally relates to computer-implemented control systems for machines such as industrial machines. The disclosure relates more specifically to interfaces for classifying operating behavior of machines.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Power plants, waste water treatment plants, factories, airplanes, and automobiles are some examples of complex systems that include multiple machines operating to accomplish objectives. These complex systems include physical components that degrade over time, components that fail, and components that are being used incorrectly or sub-optimally. Degradation, failure, or incorrect or sub-optimal use of a given component in the system may affect other components of the system that depend on the given component.

As a component operates in the system, the component may be configured to operate differently during different operating states. For example, a machine may power up, warm up, run, cool down, and shut down. The machine may be configured to produce little or no output during the power up state; whereas, the machine may be configured to produce maximum output during the run state. Regardless of how a component is configured, the component can behave unexpectedly in any operating state. In a complex system, multiple components may behave unexpectedly for a long period of time even though the system as a whole may operate relatively efficiently over that period of time.

Operation of various components in the system may be monitored using sensors, which measure and report data about the operational behavior of the components. The sensors themselves are also susceptible to degradation, failure, and sub-optimal use, and this susceptibility creates uncertainty around the measurements themselves and around the behavior of the components in the system. The sensors may feed into customized triggers that provide alerts when measurements go outside certain boundaries. The customized triggers may be set up by engineers, such as maintenance engineers, that are assigned to oversee operation and maintenance of the machines and to promote overall health and efficiency of the system.

Accordingly, the overall health and efficiency of the system may be highly dependent on the knowledge, skill, expertise, and accuracy of the maintenance engineer, who is a human being. The overall health and efficiency of the system may also depend on a variable degree of uncertainty surrounding the sensors and the behavior of the components in the systems. In light of the complexity of the system, there are often few human beings who are able to make the accurate judgments required by the maintenance engineer, and even fewer who are available to verify the correctness of the judgments made by the maintenance engineer. Although the output of a given system may be observed at a high level, there is usually little or no knowledge of how much better the maintenance engineer could be performing.

Further, some machines come with manuals or specifications that explain, to the maintenance engineer, how frequently to perform certain maintenance operations on the machines. Due to the wide variety of systems and changing operating environments in which the machines may be used, such manuals or specifications often grossly over-estimate or under-estimate the frequency in which such maintenance should be performed in a given environment. Such problems are often difficult to detect and often lead to inefficiencies that exponentially increase as the size and complexity of the system increases.

DETAILED DESCRIPTION

Figure 1:
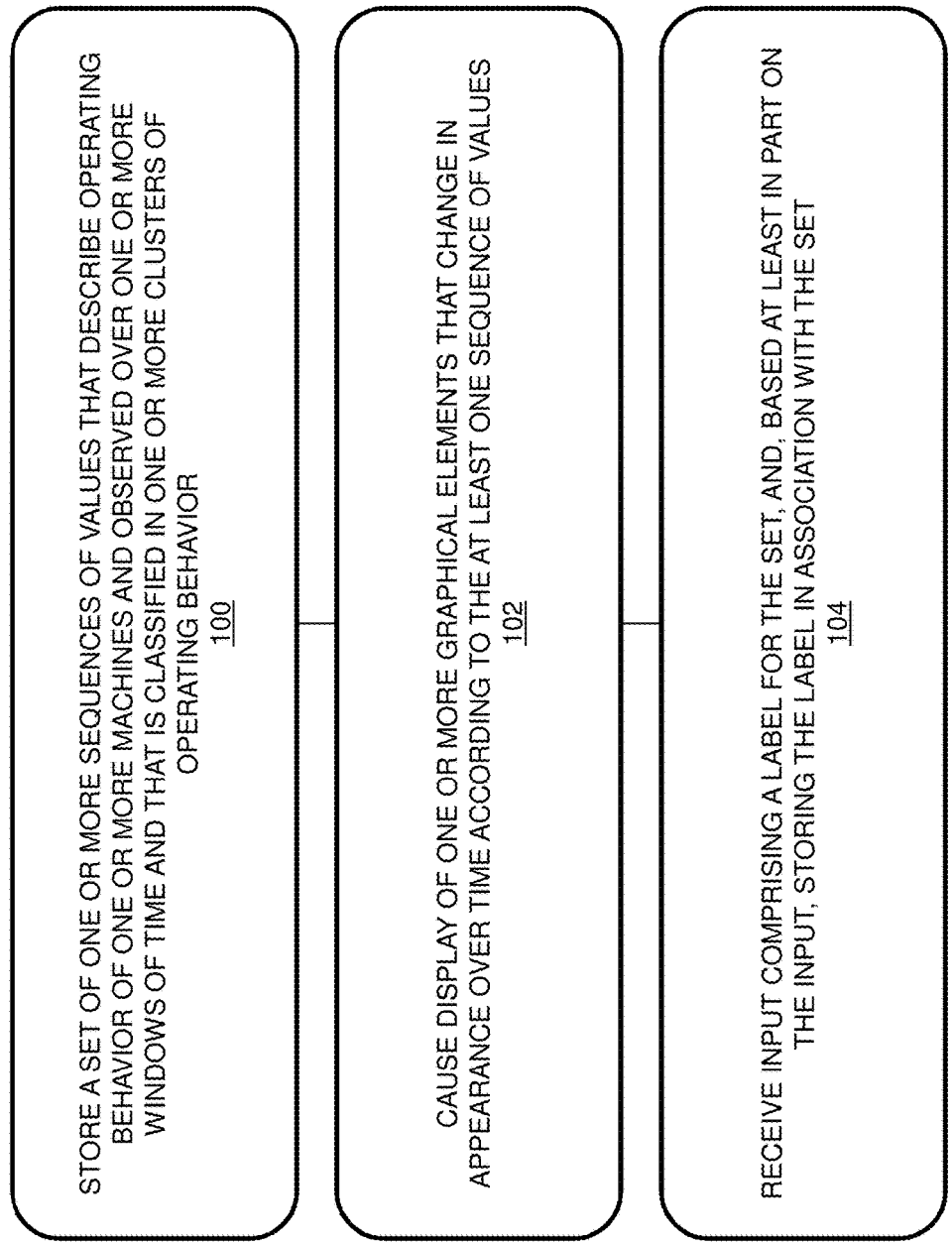
FIG. 1 illustrates an example process for labeling machine health information that is displayed in motion.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. In this description, things identified using the plural include embodiments that use one or more things or a single thing. For example, each reference to devices, services, models, clusters, rules, and graphical elements includes the singular as well as one or more items.

General Overview

In various embodiments, computer systems, stored instructions, and technical steps are described for generating, causing display of, sending, or otherwise providing one or more interfaces for monitoring machines, classifying operating behavior of the machines, and/or predicting operational behavior of the machines. The machines may include, for example, physical systems of a variety of functioning units, physical units of particular functions operating together, physical components supporting a particular function of a physical unit, sensors measuring inputs, outputs, or byproducts of any element of the system, and/or any other physical assets or physical elements that contribute to an industrial or complex physical operation.

In an embodiment, a computer-implemented method comprises storing a set of one or more sequences of values that describe operating behavior of one or more machines. The operating behavior may have been observed over one or more windows of time and may be classified in one or more clusters of operating behavior. In this embodiment, at least one sequence of the one or more sequences of values change over time. The method further comprises causing display of one or more graphical elements that change in appearance over time according to the at least one sequence of values. Additionally, the method comprises receiving input comprising a label for the set, and, based at least in part on the input, storing the label in association with the set.

In one example, the interfaces include graphical user interfaces that display information via a display, such as a light emitting diode (LED) or active-matrix organic light-emitting diode (AMOLED) computer monitor, television, or mobile device (for example, a phone, a tablet, or a phablet) display, or a liquid crystal display (LCD) computer monitor, television, or mobile device display. The interfaces may cause display of information concurrently with options for receiving feedback or selections via operation of an input device (for example, a touch screen, a mouse, a keyboard, a camera, or a microphone) to a machine (for example, a computer, television, or mobile device). The interfaces may change the display of information to cause display of certain information in more or less depth or focus.

In another example, the interfaces include application programming interfaces (APIs) or services that are exposed to an application or client that is able to interact with the interfaces via commands or data structures that are recognized by the interface. The commands or data structures, when received or otherwise accessed by an interface manager, cause the interface manager to perform operations such as updating the interface, or providing, reading, analyzing, creating, or modifying information, such as information about the operating behavior of machines in a system.

In one embodiment, one or more computer systems are specially configured to operate as interface managers. A computer system may be configured to operate as an interface manager according to one or more stored sequences of instructions which, when executed, cause the computer system to perform certain technical steps in certain circumstances or environments. The interface manager may cause display of, send, expose, or otherwise provide a graphical user interface to a browser, which may be coupled to a display device, or directly to a display device. For example, the interface manager may create a Web page, document, or set of documents that, when rendered by a browser or visualization software operating on a computing device, cause display of a graphical user interface to a user of the computing device. Alternatively, the interface manager may send, expose, or otherwise provide an application programming interface (API) or service to an application or client that is able to interact with the interface via sent commands or stored data structures.

FIG. 1 illustrates an example process for labeling machine health information that is displayed in motion. The process may be performed by one or more computing devices, such as a computer operating according to interface manager instructions.

Step 100 includes storing a set of one or more sequences of values that describe operating behavior of one or more machines that was observed over one or more windows of time and that is classified in one or more clusters of operating behavior. In step 102, the process causes display of one or more graphical elements that change in appearance over time according to the at least one sequence of values. In step 104, the process includes receiving input comprising a label for the set and, based at least in part on the input, storing the label in association with the set.

Figure 2:
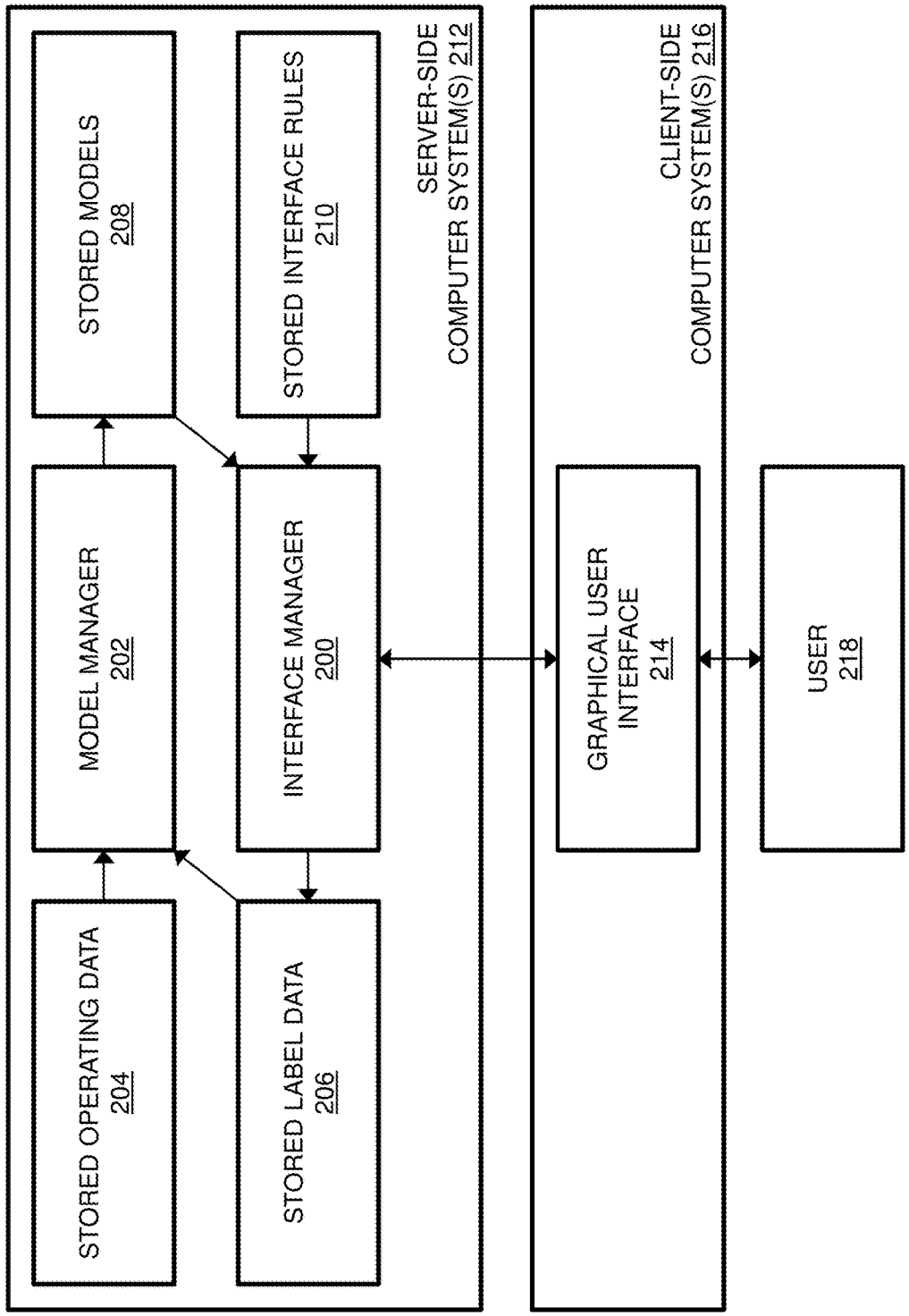
FIG. 2 illustrates an example system for labeling machine health information that is displayed in motion.

FIG. 2 illustrates an example computer system for labeling machine health information that is displayed in motion. In an embodiment, interface manager 200 uses stored models 208 and stored interface rules 210 to generate elements of a graphical user interface 214 on server-side computer system(s) 212, which are sent to client-side computer system(s) 216 for presentation to a user 218.

In an embodiment, the stored models 208 are generated by model manager 202 based on stored operating data 204 and stored label data 206. For example, operating data 204 includes measurements that have been collected from machine sensors, and label data 206 includes labels that have been provided by human experts via graphical user interface 214.

Stored interface rules 210 may be built into interface manager 200 or customizable by users via graphical user interface 214. The stored interface rules 210 specify how to present the stored models to users via graphical user interface 214. For example, stored interface rules 210 may define user task specific views that keep track of which types of information are desirable in different scenarios, where such information should be displayed on the screen, the visual prominence or relative size with which certain information should be displayed, and which types of information should be available as secondary options, via the graphical user interface, even if they are not presented on a main screen.

Stored interface rules 210 may be user-specific, specific to a group of users, or generic with respect to all users. "Users," in this context, may refer to individuals or computers or accounts that the individuals use. For example, some users may want to see more information associated with the physics (heat, pressure, volume, etc.) of a machine system, while other users may want to see more information associated with machine specifications (as a percentage of maximum approved load or a percentage of minimum approved resources, etc.). Interface manager 200 may accommodate these preferences via graphical user interface 214 by associating a user with a respective user-specific interface rule and associated view.

As another example, a particular user may have indicated an interest in a particular parameter, and interface manager 200 may include the particular parameter on graphical user interface 214 regardless of the statistical relevance of the particular parameter to the visualization being displayed. In this manner, users may track parameters that they perceive to be the most relevant on the graphical user interface.

Multi-Actor Systems

In one embodiment, the interface manager 200 creates a multi-actor state visualization, where each actor has interesting characteristics that may drive global actor-wide performance in an observed operating event. In this context, an "actor" may be representative of a machine, a part of a machine, a subsystem of a machine having plural parts, or a set of subsystems. The different characteristics may be visualized with graphical elements such as colored boxes, other shapes or lines, line thicknesses, glyphs, sounds, icons, or points along an axis of a graph. The interface manager 200 may filter out, from the visualization, those characteristics that are not relevant to detected patterns in the data. For example, if a characteristic remains relatively constant whether or not a particular state is observed, then the characteristic might not be relevant to classifying the particular state. By filtering out irrelevant or less relevant parameters, the interface manager 200 may focus on, for example, 1-20 parameters instead of 1,000-20,000 parameters. Such a focus allows a human user to better understand the environment being described by the parameters.

Even after values have been filtered out, visualizing the state of a system or components therein is highly complex when the system has multiple actors. The visualization is complex due to the plurality of observed states, the plurality of possible states, the plurality of transitions between the states, plurality of dependencies or conditions among the states or components, physical relationships or connectedness among the components, and/or the plurality of measurements associated with the states. For example, a pattern that is classified as a particular state may include a plurality of parameters, each of which changes in value over time. These sequences of values may collectively define the particular state, but the numbers may be meaningless without a highly sophisticated visualization.

In one embodiment, the visualized system may have competing actors where an actor is configured to defeat other(s), or cooperating actors where an actor is configured to assist other(s). In typical physical systems (such as power generator unit), actors work cooperatively. For example, a power system may have a combustor that burns fuel, a turbine section that spins as a result of the pressure gradient created by the heat from the combustor (where the pressure is high near the heat source and low further from the heat source), making the blade spin. In the example, the combustor assists the turbine, which assists the generator. The generator is a shaft that is spinning, sitting on the same ball bearing of the last turbine section. The turbine section is an empty ring with inner teeth that sit on a gear with outer teeth. The teeth of the gear spin as a result of the turbine section spinning on the outside. In such a system, observing the heat and/or speed of a given component may be meaningless without the proper context.

The visualized system may also have compensating actors. For example, a system may rely on one component to perform well when another component performs poorly, and vice versa. Such compensating actors are representative of closed-loop systems whose objective is to maintain certain desired goals in context of change. For example, the compensating actor may be involved in refilling an oil tank when the oil tank is drained beyond a certain amount. As another example, the compensating actor may be a backup power source that operates when a primary power source is not supplying enough power to meet power demands.

The interface manager 200 may present, via a graphical user interface, various patterns of values, and prompt users such as experts to label the various patterns. The states may be specific to a particular actor in a system or may cover multiple actors that are working together in a competing, cooperating, and/or compensating manner. The various states may account for degradation of objects of action or degradation of actors, characteristics of actors, or other historical performance of actors. For example, an actor may go through a breaking in period where performance gradually increases, a peak period where performance remains relatively steady, and/or a period of degradation where performance gradually declines.

The interface manager 200 may cause patterns to be labeled by users even if the interface manager does not have any prior information about the monitored system or the purpose of the monitored system. The labels provide a semantic classification of the patterns and form the basis for decisions and triggering of event notifications when such patterns are recognized. Without such information, the interface manager 200 may present distinct patterns or types of patterns, highlighting variables that are highly relevant to the distinctness of the patterns or types of patterns, and prompt users to label the patterns or types of patterns. Once the patterns are labeled, the interface manager 200 may incorporate the label information into future presentations of the patterns on the graphical user interface. For example, the interface manager 200 may color a graphical element red to indicate that the graphical element corresponds to a machine that is estimated to be in a state that has been labeled as a negative state.

Collecting and Providing Information about Machine Operating Behavior

The interface manager 200 causes display of, sends, exposes, or otherwise provides information about machine operating behavior for consumption by users, applications, or clients. Such information may be stored as one or more sequences of values that describe operating behavior of one or more machines over time as the machines operate. The operating behavior may have been observed over one or more windows of time and may be classified or clustered into one or more clusters of operating behavior such that similar events or occurrences over time end up in the same clusters. At least one sequence of the one or more sequences of values may change over time. Some sequences of values may or may not change over time, depending on the operating behavior of the machines.

The clusters may be formed by detecting patterns or groups of measurements that are historically similar according to a clustering technique such as k-means clustering. For example, similar types of machines may operate similarly during startups, trips, and times of peak operation. The measurements obtained during these different operating states may result in different clusters of operating behavior for the similar types of machines. In the example, one cluster may include or be based on measurements obtained when the similar types of machines are experiencing a trip, another cluster may include or be based on measurements that are obtained when the similar types of machines are starting up, and yet another cluster may include or be based on measurements that are obtained when the similar types of machines are in times of peak operation.

The different clusters may have significantly different measurements from each other as a result of the machine or machines operating differently (for example, performing different functions, operating using different hardware or physical equipment or in different environments, operating in different modes, phases, stages, or states, or having different amounts of degradation). In one example, when a machine is tripping, the machine is likely not increasing output or providing peak output. Similarly, when a machine is starting up, the machine may be increasing output but is likely not providing peak output. When a machine is providing peak output, the machine is likely not providing significant increases in output. Therefore, different clusters of measurements may be collected from tripping machines than from machines in peak operation or machines that are starting up.

Each cluster may be stored as a snapshot of operating behavior that results from multiple sequences of values that have been assigned to the cluster. For example, the snapshot may reflect the average (mean, median, or mode) operating values over the average length of time of sequences of values that have been assigned to the cluster. Different sequences may be assigned to the same cluster, and the different sequences correspond to the same machines at different times or different machines at same or different times. Once determined, the snapshot provides average measurements for the corresponding operating behavior. For example, if the different sequences of values assigned to a cluster correspond to different trips that were experienced in a set of machines, then the snapshot provides information about average measurements for a trip in the set of machines. Similarly, if the different sequences of values assigned to a cluster correspond to different times of peak operation in a set of machines, then the snapshot provides information about average measurements for peak operation in the set of machines.

The snapshots of operating behavior may be stored in machine operating models together with information about which snapshots likely lead to other snapshots. By determining which snapshots likely lead to other snapshots, the machine operating models may indicate causal or before-and-after relationships between parameters and states of machines corresponding to the clusters. In other words, causal connections may be determined based on a statistical observation that, with a significant likelihood, some states frequently follow other states. The causal connection may be based on time and frequency among different states and different machines. The causal connection can also be used to predict states or events that have not yet occurred but involve similar components to those that have been causally connected in the past. For example, a before-and-after observation may be made for one machine or set of machines, and the before-and-after observation may be extended to another same or similar machine or set of machines even though the after portion has not yet occurred. The model manager 202 may also learn causal relationships when a user explicitly labels a component or state as a cause of another state or event.

The sequences of values, whether the sequences are average values that appear in a snapshot or distinctly observed values from past operating data, may be stored or managed by the model manager 202, which may be implemented in an embodiment as one or more computing devices configured to execute stored modeling instructions. The model manager 202 analyzes operating data that describes past operation of machines of a variety of types and, based at least in part on the operating data or other contextual information about the machines, generate and store machine operating models. "Models," in this context, may mean relations, equations, graphs, tables, state machines, or other data stored in computer storage and that describes past or expected future operational behavior of the machines corresponding to states of the machines. The models may also include definitions that apply to classes of machines and which are re-useable for different machines of the same class. For example, motors may operate similarly even though one motor is manufactured by GE and another motor is manufactured by Honeywell.

The machine operating models may include patterns such as the snapshots or transitions between snapshots, and each pattern may be associated with a different set of operating states of machines. The patterns may be time series or time-based data, or characteristics thereof, that capture, represent, or are otherwise based on average or persistent measurement (observable) trends for one or more machine parameters over time, such as temperature, pressure, speed, vibration, current, sound, power or resource consumption, movement, torque, or power, resource (refined oil, water, etc.), or byproduct (pollution, carbon dioxide, etc.) output. Some parameters, such as temperature, may trail other parameters, such as engine speed. The operating states may include normal, abnormal, or even failing conditions of machines and/or their components (for example, Gearbox_Status, MotorCoil_Status, Shaft_lubrication_Oil_Status, Bearing_Status, heatExchanger_Status), and the operating states may alternatively or additionally include information about a stage of operation such as starting, running, or shutting down and stressing or otherwise associated with particular operating environments, such as cold-season, hot-season, etc.

The machine operating models, snapshots, or other sequences of values may be used by the interface manager to cause display of observed, average, or expected measurements or states of machines. If different snapshots have been identified as different states of machines, the interface manager may cause display of state information, such as which states the machine is in, instead of or in addition to the observed, average, or expected measurements. Some states or measurements may be associated with positive characteristics of the machines, and other states or measurements may be associated with negative characteristics of the machines. These positive or negative characteristics may be apparent from the measurement or state and their semantic labeling, or may be emphasized using color, size, or even explicit warnings on a graphical user interface.

Using Nelson Rules to Detect Patterns

In various embodiments, a model manager 202 may detect patterns in the data based at least in part on known pattern definitions or rules that indicate likely characteristics of data. For example, the pattern definitions may be based on Nelson rules for detecting non-random conditions in data. The rules detect the non-random conditions for sequences of values based on the mean and/or standard deviation of the sequences, and these rules or similar rules may serve as a starting point for identifying interesting sequences of data. The example Nelson rules are provided below for reference.

A first rule is used to detect when a sample is largely out of control or abnormal. The sample is out of control or abnormal when one or more points is more than three standard deviations from the mean.

A second rule is used to detect when a prolonged bias exists in the data. The prolonged bias may be detected when nine or more points in a row are on the same side of the mean.

A third rule is used to detect when a trend exists. The trend exists when six or more points in a row are continually increasing or decreasing.

A fourth rule is used to detect oscillation in the data. The data has oscillation when fourteen or more points sequentially alternate in directing, increasing then decreasing.

A fifth rule is used to detect a sample that is mediumly out of control. The sample is mediumly out of control when two or three out of three points in a row are more than two standard deviations from the mean in the same direction.

A sixth rule is used to detect a sample that is slightly out of control. The sample is slightly out of control when four or five points in a row are more than one standard deviation from the mean in the same direction.

A seventh rule is used to detect a sample that is steady. The sample is steady when fifteen or more points in a row are all within one standard deviation of the mean on either side of the mean.

An eighth rule is used to detect a non-random event. The non-random event is detected when eight or more points in a row exist with one of the points being within one standard deviation of the mean and the points being on both sides of the mean.

Other pattern detection rules may be used instead of or in addition to Nelson's rules such as spatio-temporal relations between trends in measurements or states.

Showing Changes in Motion

After machine operating behavior has been clustered into sets that include similar patterns of behavior, the interface manager 200 may discover the meaning of individual clusters and how to use the information provided by the clusters. The interface manager 200 discovers this additional information by causing display of the cluster information in a manner that is well-suited for human analysis and feedback to improve accuracy and correctness. For example, the interface manager 200 may cause display of patterns comprising changing values over time on an graphical user interface that shows the changes among graphical elements. The interface manager 200 may play the patterns, and the patterns may show positive or negative values move from component to component in a system.

In one embodiment, the interface manager 200 causes display, on a graphical user interface of a computer display device, of one or more graphical elements that change in appearance over time according to at least one sequence of values that changes over time. By changing the appearance of the graphical elements over time, the graphical user interface may highlight certain changes or patterns of changes in the data. An expert human user viewing the changes may then be able to classify or confirm or reject an estimated classification of the changes or patterns that were displayed and thus provide feedback for the system to adapt.

In one example, the changing graphical elements may show traversal of a negative status (or a positive status) that starts in one component and spreads to other components in the system. The negative status (or positive status), as indicated by a particular color, size, or characteristic of a graphical element, may start in a first machine and visibly traverse to one or more other machines that are physically connected to the first machine. The changing values may be illustrated using glyphs, colors, colored boxes, shapes or lines, line thicknesses, sounds, icons, and/or points along an axis (for example, on a two-dimensional or three-dimensional graph).

In a particular example, negative status is indicated by a reddish color, and positive status is indicated by a greenish color. Over time, the graphical user interface may cause display of a machine component that turns from green to red and then causes other nearby or dependent machine components to turn from green to red. Based on the movement of the red or green regions among the depictions of different machines in a system, an expert viewer may be able to classify or label the status and/or specify steps that can be taken to prevent the further spread of the red regions.

In another example, the interface manager 200 causes display of some system architecture and/or changing values on a video track, and the video track is paired with an audio track that uses sound to represent other changing values. The audio track and video track may be played, paused, and otherwise controlled together to provide a maximal exposure to the user of changing values in the system. In one embodiment, the audio portion contains auditory warnings or labels for a sequence of changing values that is playing in video form. For example, the auditory warnings or labels may indicate that a tank volume was below a threshold at a certain time in the audiovisual track, or that a heat rose above a certain temperature at a certain time in the audiovisual track.

In one embodiment, the interface manager 200 causes display, on the graphical user interface, of graphical representations. Each graphical representation element in the graphical representations represents a machine in a system. The graphical representations may be displayed concurrently with the graphical elements that change in appearance over time according to at least one sequence. For example, the graphical element may be a fill color of the graphical representation itself, or may be an icon, line, or point within the graphical representation that changes in size or color based on the changing values. Using graphical representations that correspond to actual machines in the system, optionally shown in a diagram with representations of known physical connections or dependencies between the machines, may create a more readily understood representation of the changing physical state for the expert.

The interface manager 200 may show the changes over time by playing a time series of measurements at the unit-level, component-level, or system-level. The time series may be played in a manner similar to a movie or a movie clip, and may be accompanied by controls on the graphical user interface to fast forward, step or slow forward, play, pause, rewind, or step or slow backward. The graphical user interface may include these controls so that a user, using the controls, may control the speed of progress of the played state. The graphical user interface may also include regions or options that accept label input that labels an observed state as the time series is playing or when the time series has finished playing. The time series may relate to a deployed component that is actually operating in a system, or an estimated virtual component that is based on measurements that frequently occur over multiple deployed components and even over multiple systems.

In one embodiment, the interface manager 200 causes display of the changing values on a schematic or model of a system, which may identify different units, components, or sensors in a system and may arrange these different elements spatially with respect to each other. Elements that are physically connected or physically dependent on each other may appear adjacent in the schematic, and elements that are mostly unrelated or distantly dependent may appear further from each other in the schematic. The different elements may be shown as different boxes in a box diagram form or as icons or specially shaped units that give visual clues as to the functionality of the elements. For example, an oil tank may appear as a container, and an engine may appear as an external casing of an engine that is connected to the container.

In addition to showing multiple elements in a system of machines, the schematic may show connections between the elements. The connections may show input(s), output(s), internal state(s), and/or external state(s) of the different elements. The connections between elements show how one element interacts with another element. A connection may be marked as unidirectional with an arrow or other marking indicating a direction of dependency or flow, or bidirectional either without arrows or with multiple arrows indicating directions of dependency or flow.

In one embodiment, the schematic may be a 2D or 3D engineering drawing that shows specific or approximate locations of sensors, components, or units in a system. For example, the drawings may show the sensors as they are located physically in an industrial plant such that sensors on an engine are shown on the engine in the drawings. The locations may be determined from geophysical locations associated with the different sensors, components, or units in the system. The geophysical locations may be manually entered, approximated based on knowledge of the system, or collected from global position system (GPS) or a localized positioning system for the system. The geophysical locations may be offset or adjusted to account for fine-grained locations that may not be reflected by the GPS position. These offsets may be determined from schematics for individual units, components, or sensors. For example, schematics for a server may indicate that a fan is adjacent to a processor and approximately one centimeter from a temperature sensor.

The schematic may be displayed on the graphical user interface concurrently with graphical information about values that are changing in a played sequence corresponding to an interesting state of machine(s).

In one embodiment, a system monitor, such as one or more computing devices configured to collect data from a system and analyze the data, may detect a current state that is directly or indirectly connected to a fault or abnormal state downstream or upstream. As a result, the system monitor may work backwards or forwards along causally related snapshots of states to determine a source where the state might have started or a potential result of the state. These new possible connections or interactions may be determined based on likelihoods that they appear together, and users may confirm these new possible connections or interactions via the graphical user interface by labeling a display that shows both states as part of the same event, which may correspond to the same cluster.

In one embodiment, as the states change, a physical element in the system may be changed on the schematic or display as a result of a corrective or maintenance action taken with respect to the system. For example, a worn or degraded physical element may be swapped with a new element, and the interface manager may cause the interface to display options for adding new elements or taking other corrective or maintenance actions with respect to the system.

In some embodiments, the operator or user of the graphical user interface might not have or need the schematic or any design specification that shows the physics of the system or certain parts thereof and/or how components are connected. In these embodiments, the operator may be able to determine the state with little information other than changing value patterns in the most relevant parameters. The user may be assisted by flagging normal or abnormal data, or by marking or coloring data that has been indicated to be associated with a negative state or positive state. The interface manager 200 may also provide options for the user to dig deeper into the interface for more detailed information and quantitative explanations in terms of other value trends (in sensor measurements) than is provided in high-level selected values.

By displaying values in motion, the interface manager 200 facilitates visualization of states and changes in states in a scalable manner that may utilize previously provided labels. For example, a low-level state such as a sensor-level state, a component-level state, or a unit-level state may be classified by past label input as a normal, abnormal, or failure state. The low-level state may later be labeled as the given state when playing a higher-level state such as a system-level, unit-level, or component-level state. In a particular example, normal states may be labeled as green, abnormal states as yellow, and failure states as red, and the graphical user interface may incorporate this information when playing states.

Certain channels, parameters, units, components, or sensors may be filtered out based on their relevance to a state of measurements belonging to a cluster. For example, the interface manager 200 may filter out certain types of parameters such as heat, pressure, fluid motion, electric, and resource utilization to limit the graphical display to those parameters that are interesting and relevant to the cluster. As another example, the interface manager 200 may filter out certain individual parameters such as values collected from a specific sensor or from a specific component that is known to be less relevant to the cluster. The interface manager 200 may select the most interesting or relevant parameters to be displayed on the schematic based on the parameter values that are most unique or distinct to the cluster being analyzed. The interface manager 200 may cause changes among these selected values to be visualized over a window of time on the schematic.

In one embodiment, by overlaying the changing values on the schematic, the interface manager 200 may provide visual cues to indicate statistically related or correlated changes in state that occur over time, while ignoring states and changes in state that are not statistically related or correlated. The overlay conditions or trains the user to pay attention to these elements that have potential physical relationships, and the user may label the event according to physical relationships that are known to the user.

The visualization may also show hidden interactions between components that have closely correlated measurements but are not yet recognized as physically related in any physical model. These components may be recognized by the interface manager 200 as physically related once the components are identified to be part of a state that requires such a physical relationship between the components. For example, after receiving label input for a "low fuel" state involving an engine and a fuel tank, the interface manager may recognize a physical relationship between the engine and the fuel tank even if that physical relationship was not previously known. The relationship may be determined based on metadata stored about the "low fuel" state. The metadata indicates that the low fuel state includes a resource supplier acting in a certain way and a resource consumer acting in another way. By labeling the state as the low fuel state, the interface manager is forced to classify the fuel tank as the resource supplier for the engine.

In one embodiment, the interface manager 200 uses motion to bias a user to predict what is likely to occur. The motion may show a pattern of changes leading along physical connections to an undesirable future state, and the user may take corrective actions to avoid the possible future state by cutting off or alleviating the expanding problem at the boundaries of the physical connections.

In one embodiment, the interface manager 200 may highlight parameters that change the most significantly during a given sub-sequence that is played during a sequence of values. For example, as a problem spreads from machine A to machine B to machine C, the interface manager 200 may highlight a graphical element that represents a parameter as it changes to a negative state. In the example, machine B may be highlighted just before, at the same time as, or just after machine B changes from green (indicating a positive state) to yellow (indicating a questionable state). Then, machine C may be highlighted as machine C changes from green to yellow. In one example, a graphical element is highlighted by depicting a colored box or other shape around the graphical element. In another example, the graphical element is highlighted using a background color.

In one embodiment, the interface manager 200 plays graphical elements depicting one or more sequences of values from any point in time to any other point in time. For example, the interface manager 200 could play a partial sequence of values to the user, predict what events or states are occurring, and prompt the user for feedback to label the events or states.

In one example, an internal combustion engine uses a battery-powered starter. When someone presses the ignition button for the engine, a visual depiction of the battery may turn from green to yellow on the graphical user interface to indicate a sudden voltage drop, and a visual depiction of the engine may turn to yellow then green on the graphical user interface to indicate the engine is starting and then has started. The battery may then turn green again as the engine re-charges the battery. A user seeing the motion within components and between components on the graphical user interface may interact with options presented on the graphical user interface to label the event as "starting the engine" and/or as a "positive" state.

In the example, a user may also see, on the graphical user interface, an engine with good spark plugs behaving differently from an engine with bad spark plugs. For example, the user may see that the voltage in the spark plug never rose to a level that would be needed to create a spark. In the example, the spark plug may be colored yellow on the graphical user interface because the spark plug was not operating within a normal region.

In another example, the interface manager 200 may apply knowledge about one sub-system to another, similar sub-system. If a system has two fluid reservoirs each with its own valve, and the user has seen and labeled, via the graphical user interface, the failure of one valve, then, based on this label, the interface manager 200 may generate a notification for the user and/or an indicative marking on the graphical user interface when the other valve is showing similar behavior and is likely to be failing.

Showing Additional Information On Demand

The interface manager 200 may cause display, on the graphical user interface, of any additional information that is requested by a user attempting to classify the played events or states. The additional information may be provided as a supporting visualization in a separate window or overlaid on or integrated with a main window for playing a timed sequence of values and/or displaying a prediction about future state. For example, the interface manager 200 may cause display of how many times the event has been observed and other long-term characteristics of the system. As another example, the interface manager 200 may cause display of starting parameters that are generally of interest to users even if those parameters did not change significantly during the played state.

The interface manager 200 may also provide additional options, via the graphical user interface, to investigate further into the system for deeper information that may be relevant to classifying operating behavior. For example, the interface manager 200 may initially cause concurrent display of changing high-level parameters such as system-level parameters or unit-level parameters that summarize behavior of machines in a system and options to view lower-level parameters that provide more specific unit-level, component-level, or sensor-level information about the behavior.

The additional information may or may not be immediately displayed with the played pattern. The interface manager 200 may provide an option with the additional information to mark the additional information as helpful or not helpful. If the additional information is frequently marked as helpful, the interface manager 200 may incorporate the additional information into the initial display of high-level information. For example, the rating as helpful or not helpful may be used to modify a relevance score for this additional information, and the relevance score may be used to determine whether or not to include the additional information initially or an option to view the additional information when playing interesting states.

In various embodiments, the interface manager 200 may cause display, on the graphical user interface, of additional description about an event, why the event has been classified or labeled in a certain way or with a certain degree of likelihood, and/or why a time series of values is classified as an event of interest. The interface manager 200 may cause display of options to view other sets of data that have been classified into a same cluster as a displayed sequence, along with corresponding likelihoods that this other data is in the cluster.

When displaying information about a cluster, the interface manager 200 may cause display, based on historical data, of the likelihood of another event occurring at a given time in the future for different items in a cluster. The interface manager 200 may provide, via the graphical user interface, a visual aid to show the similarity of items in a cluster, similarity of observed instances of data with the cluster, and examples of cluster data leading to example states, one or more of which may be a predicted future state for a current set of data.

Additional information may be provided in response to a request for more information about a prediction or more information about a prediction's accuracy. When displaying additional information for a played time sequence, the interface manager 200 may include one or more references to specific data sets and specific labels that have been assigned by experts, optionally with reference to the experts that assigned the labels. The interface manager 200 may provide options to see additional information about these other data sets for which the labels were assigned, or more information about the other experts that assigned the labels. In one embodiment, when displaying information about another expert that provided a label, the interface manager 200 may include, on the graphical user interface, an option to rank the other expert regarding the accuracy of his or her labels. For example, the option may include a +1/−1 rating that either increases the rating of the expert due to an accurate label or decreases the rating of the expert due to an inaccurate label.

Different experts may be rated based on how accurately they have predicted the future or classified the past, based on how many other experts agree or disagree with them, based on how many labels are overruled by other experts, and/or based on how efficiently they keep the system operating under their control. For example, one expert may operate a relatively efficient factory at a first site, and another expert may operate a relatively inefficient factory at a second site.

In one embodiment, the interface manager 200 provides an option to view additional explanation for causality and underlying data that supports a prediction. For example, a timed sequence played on the graphical user interface may show a component, such as a valve, as yellow-colored, which is associated with an abnormal condition. The component may be selectable. Upon selection of the component, the graphical user interface may cause display of additional information such as average or normal ranges for that component and current values that are outside of the average or normal ranges. For example, the graphical user interface may show that the valve has been alerted as yellow because the parameter "temp">90 F and the parameter "fluid level"<1 L. In other words, the machine is running hot, and this may be due to low levels of lubricant, resulting in a higher amount of friction.

In addition to displaying the values that contributed to a prediction or classification of a state, the interface manager 200 may show, on the graphical user interface, an explanation in the form of a natural language or human-like expression. In one example, the expression may state that "The temperature has a value of 90 F and has increased at a rate of 2 F per minute, which is abnormal." In another example, the expression may provide information about causality, such as, "The temperature has a value of 90 F, which is high, and the fluid level is below 1 L. Low fluid levels such as this can cause higher amounts of friction and result in higher temperatures. If the fluid level is not increased, the engine may be irreversible damaged."

The additional information about causality or additional explanations may be stored as rules that trigger when the parameters or types of parameters relevant to the rule satisfy certain conditions. For example, the rule creating the above expression may be triggered when the temperature is higher than normal and the fluid level is lower than normal. The rule may be stored as a set of conditions or triggers paired with the natural language expression. For example, the example rule may be stored as "temp>AVERAGE(temp), fluid_level<LOWER_THRESHOLD(fluid_level); "The temperature has a value of [temp], which is high, and the fluid level is below [LOWER_THRESHOLD(fluid_level)]. Low fluid levels such as this can cause higher amounts of friction and result in higher temperatures. If the fluid level is not increased, the engine may be irreversibly damaged."

The natural language rules may also incorporate mathematical operations and/or graphs. For example, the rule, when triggered, may cause display of a trend line that shows a trend among one or more properties over time. As another example, the rule, when triggered, may determine and provide a variance of a parameter over a given time period. In yet another example, the rule may transform data from one domain to another domain, such as from a time domain to a frequency domain. The rule may also determine, be based on, or provide an accumulated value instead of an instantaneous value. In addition to being displayed as further explanation for a given classification, the rule can be used to create the classification. For example, a rule may be used to classify data into a particular state or make a prediction about a future state and to display further information behind the classification or prediction.

The rules or additional information may be based on causal analysis such as "A frequently occurred after B, and A and B relate to machines that are physically coupled." Alternatively or additionally, the rules or additional information may be based on inference or persistence, such as "A and B frequently occur together," regardless of physical connection. Alternatively or additionally, the rules or additional information may include a quantitative justification such as a probability of B given A given past occurrences of B and A. The causal information, inference or persistence information, and quantitative information can be accounted for visually in human-like expression or in a machine-like manner provide basis for a visualization but without displaying the basis.

Example Illustrated Embodiments of Showing Changes in Motion

Various example illustrated embodiments show how the interface manager 200 can be used to detect degradation, estimate remaining useful life for a system, and/or detect a fault. Each of these use cases may occur over a different time scale. For example, degradation may occur over many weeks to many months. Remaining useful life may involve the total component life, which could be many years. Faults, on the other hand, may occur instantaneously or nearly instantaneously.

Figure 3:
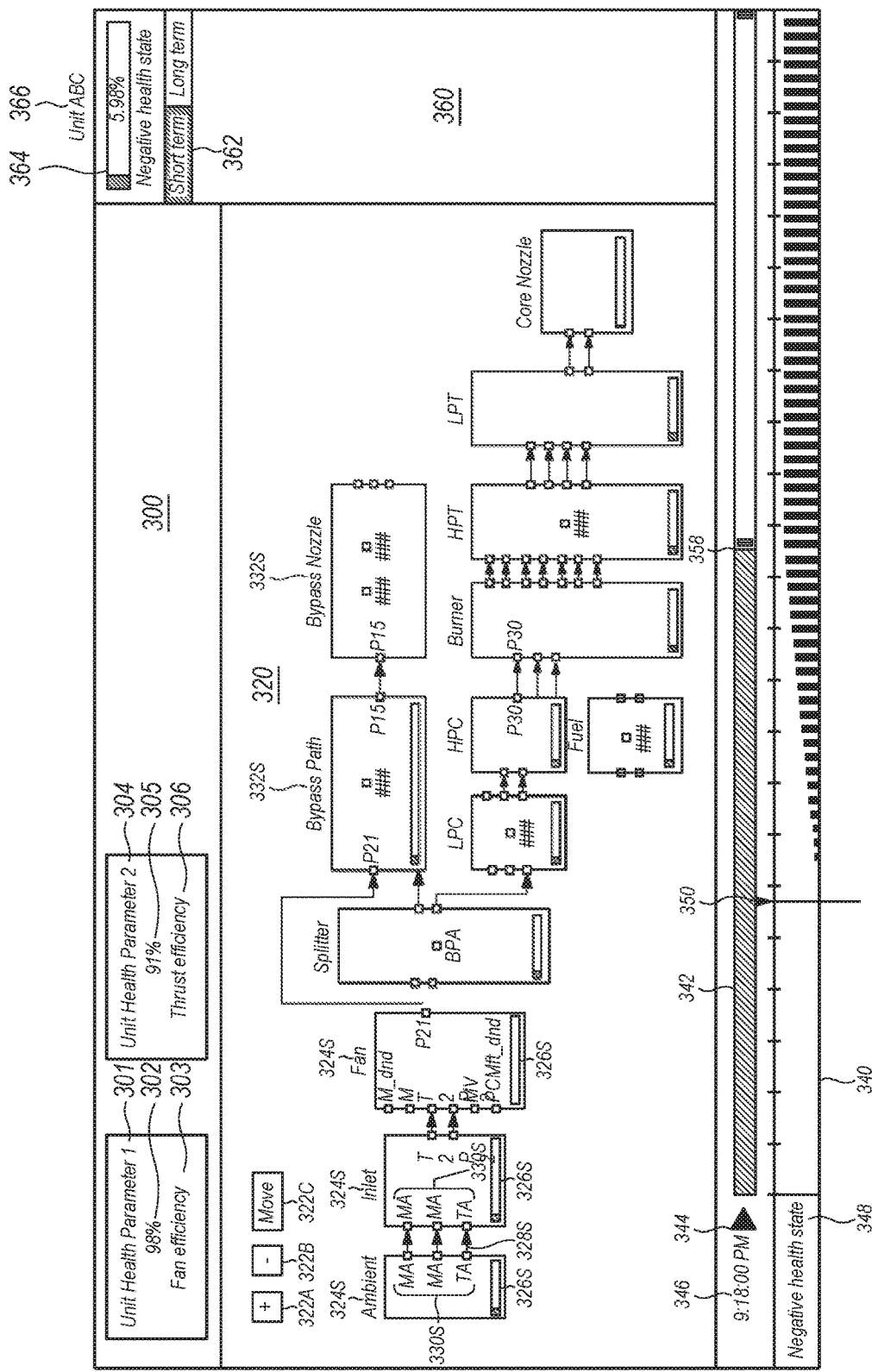
FIG. 3 shows an example graphical user interface (GUI) that displays a movie (real time or playback) of measured values related to a unit.

FIG. 3 shows an example graphical user interface (GUI) that displays measured values related to a unit, augmented with health assessments and raw unit data. Displays may comprise a movie shown at real-time speed, slower than real-time speed or faster than real-time speed. The movie plays back previously measured values. The trackhead and timeline at the bottom include options that enable the user to interact with the graphical user interface using controls that are similar to a video player.

The GUI shown in FIG. 3 has four basic panes: (1) the central canvas showing a boxology or schematic of the unit, (2) the right sidebar showing health assessments, (3) the top pane showing either derived or raw unit data, (4) and the bottom pane showing the timeline of video, a trackhead to set playback start, and a play button. In various examples, any or all of these panes and/or other panes may be displayed, and the panes may be used to display similar or different information.

In the example, FIG. 3 includes a schematic comprising boxes representing physical components in the unit and leaders connecting boxes showing how components physically interact. The bottom of each component box includes a bar that indicates its health: an increase in the fraction of red in the bar indicates an increase in the likeliness of the component being in an unhealthy or negative state. Health indicators may be shown at any level of granularity, for the system as a whole, for individual units, for individual components, or even for individual sensors.

In the example, the GUI also includes a bar in the upper right corner that corresponds to the unit as a whole. The bar in the upper right corner represents the likelihood that the entire unit is in an unhealthy or negative state.

In FIG. 3, top pane 300 shows global metrics or parameters 301 and 304 of unit health, and these metrics may be specific to the unit domain or unit type. In this example, a value 305 labeled as thrust efficiency 306 is shown in green text, and a value 302 labeled as fan efficiency 303 is shown in green text, indicating nominal or positive behavior. These metrics or parameters may be selected as those most relevant to the health of the system, unit, component, or sensor of interest.

As shown in middle pane 320, various boxes 324s represent various machine components in a system. For example, one box represents the fan in the system. The boxes also include sub-parts corresponding to sensors or points of measurement. The boxes are labeled using labels 332s. As shown, the box labeled as fan has 7 sensors, including, for example sensor P21, which may correspond to a pressure measurement. Some of the machine components are connected to each other, shown as connections 328s, with sensor(s) on one or both ends of the connection. For example, sensors T2 and P2 measure exchanges, associations, or relationships between inlet and fan. In the example, sensor T2 may correspond to temperature, and sensor P2 may correspond to pressure. Middle pane 320 also includes selectable options 322A, 322B, and 322C to zoom in, zoom out, or pan around the schematic of boxes 324s.

Boxes 324s also include status bars 326s, each of which indicates the overall health of the machine represented by the corresponding box. As shown, the status bars 326s in FIG. 3 include little red, which indicates that the corresponding machines are in good overall health.

Also as shown, the bottom pane 340 in the GUI includes the timeline 342. The timeline 342 is responsive to user-controlled movement of the trackhead 350 to adjust or control the playback start time or current playback location. The trackhead 350 also moves forward as the movie plays and may be dragged forwards or backwards to advance or rewind the movie. The bottom pane 340 also includes a play control 344, which may turn into a pause or stop control as the time-based measurements are playing. The bottom pane 340 also includes a time and/or date 346 associated with the measurements being observed.

The horizontal gray bar 358 on the GUI provides a user-controlled mechanism for zooming in and out in time, such as in Final Cut Pro® for movie editing. Multiple tracks can be shown concurrently. The example in FIG. 3 shows the track 348, which is "Negative Health State" over time. As shown, although the health of the system is good at the observed time corresponding to trackhead 350, times ahead of trackhead 350 correspond to negative health states.

The right pane 360 includes a global health state bar 364, which corresponds to the health state of the unit being observed (labeled as unit ABC 366 in the example). Right pane 360 also includes an option 362 for analyzing short-term or long-term health. As shown, short-term health is selected.

Figure 4:
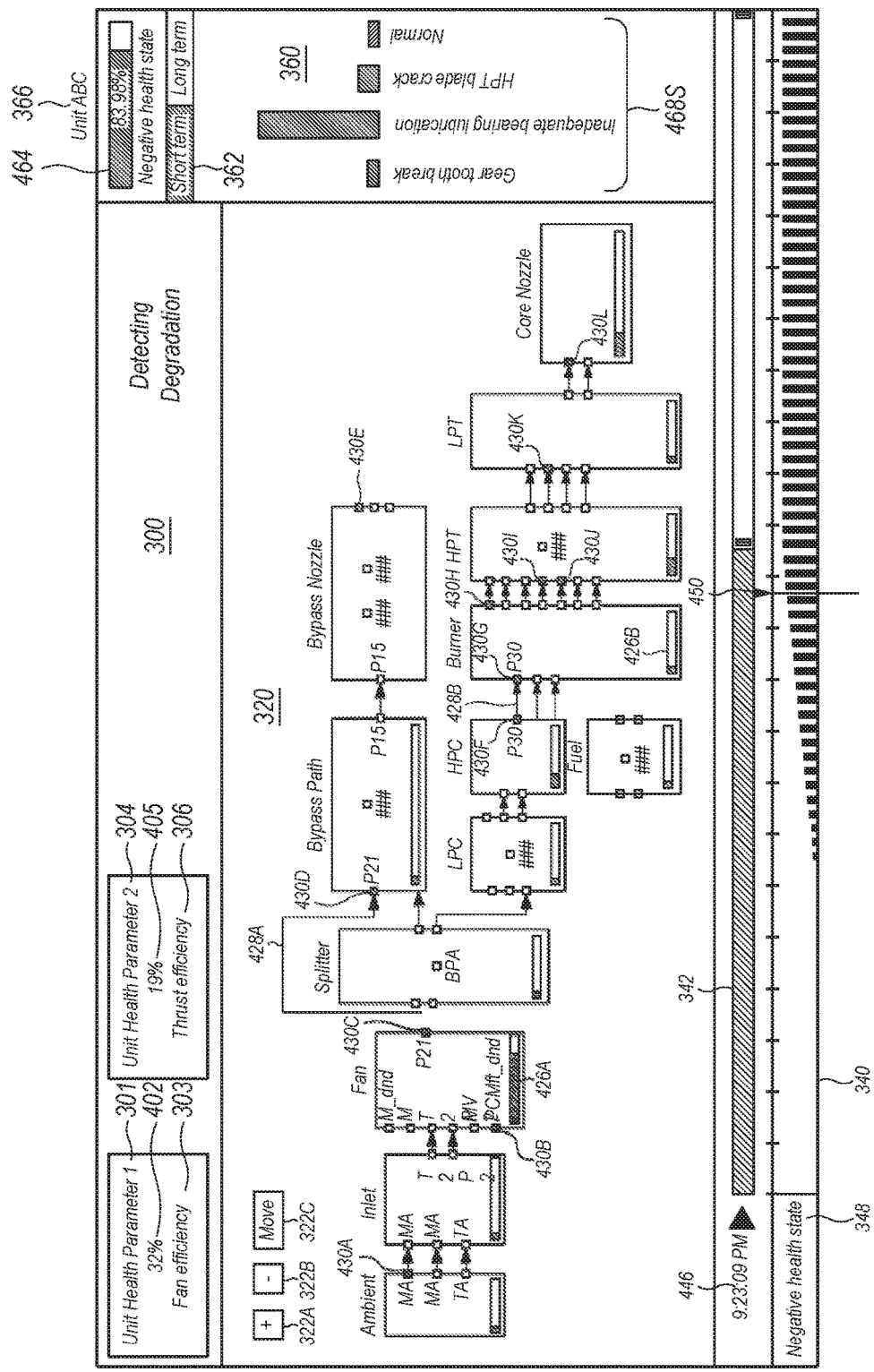
FIG. 4, FIG. 5, FIG. 6 show three example stages during playback where degradation is detected.
Figure 5:
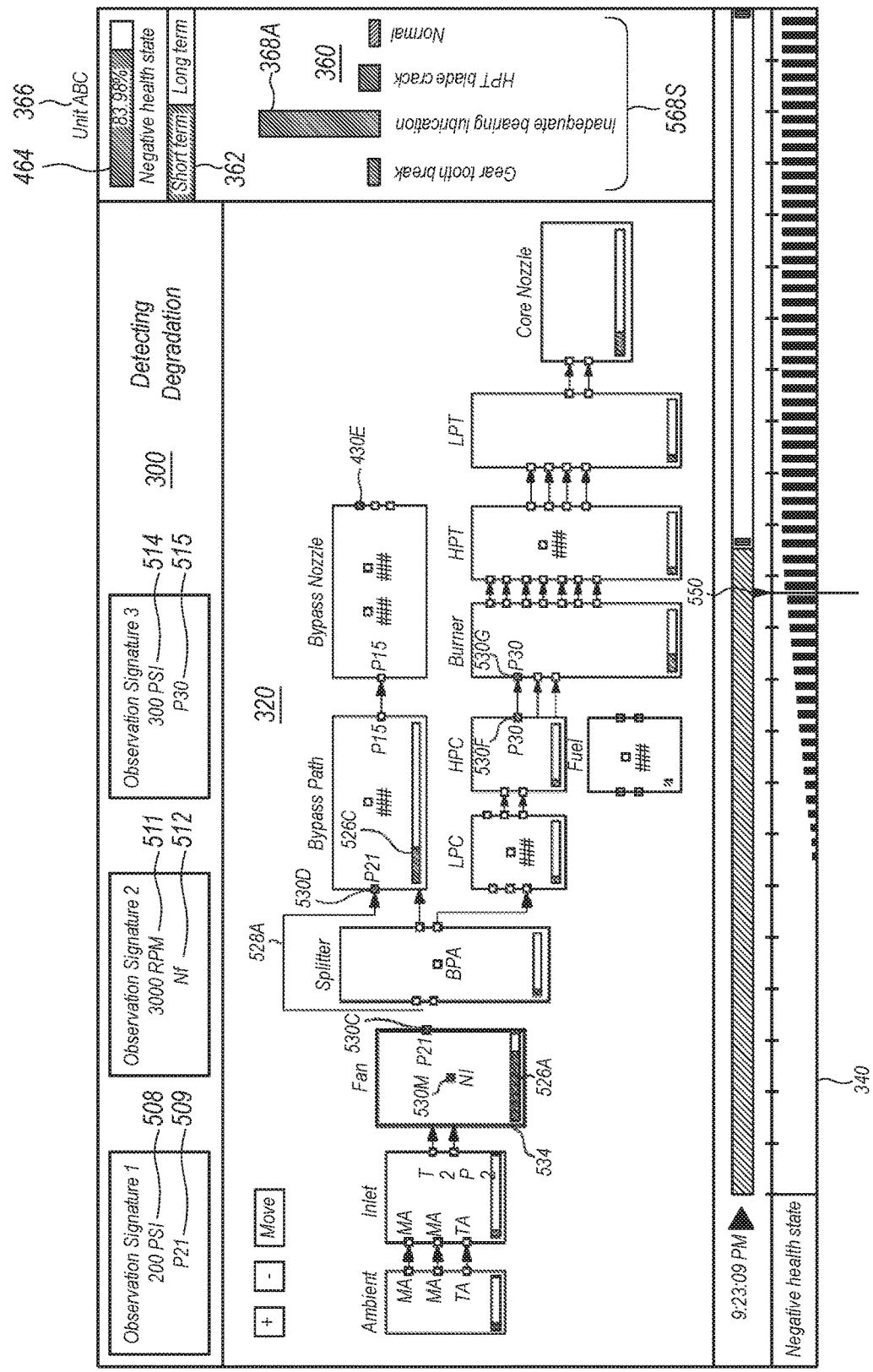
Figure 6:
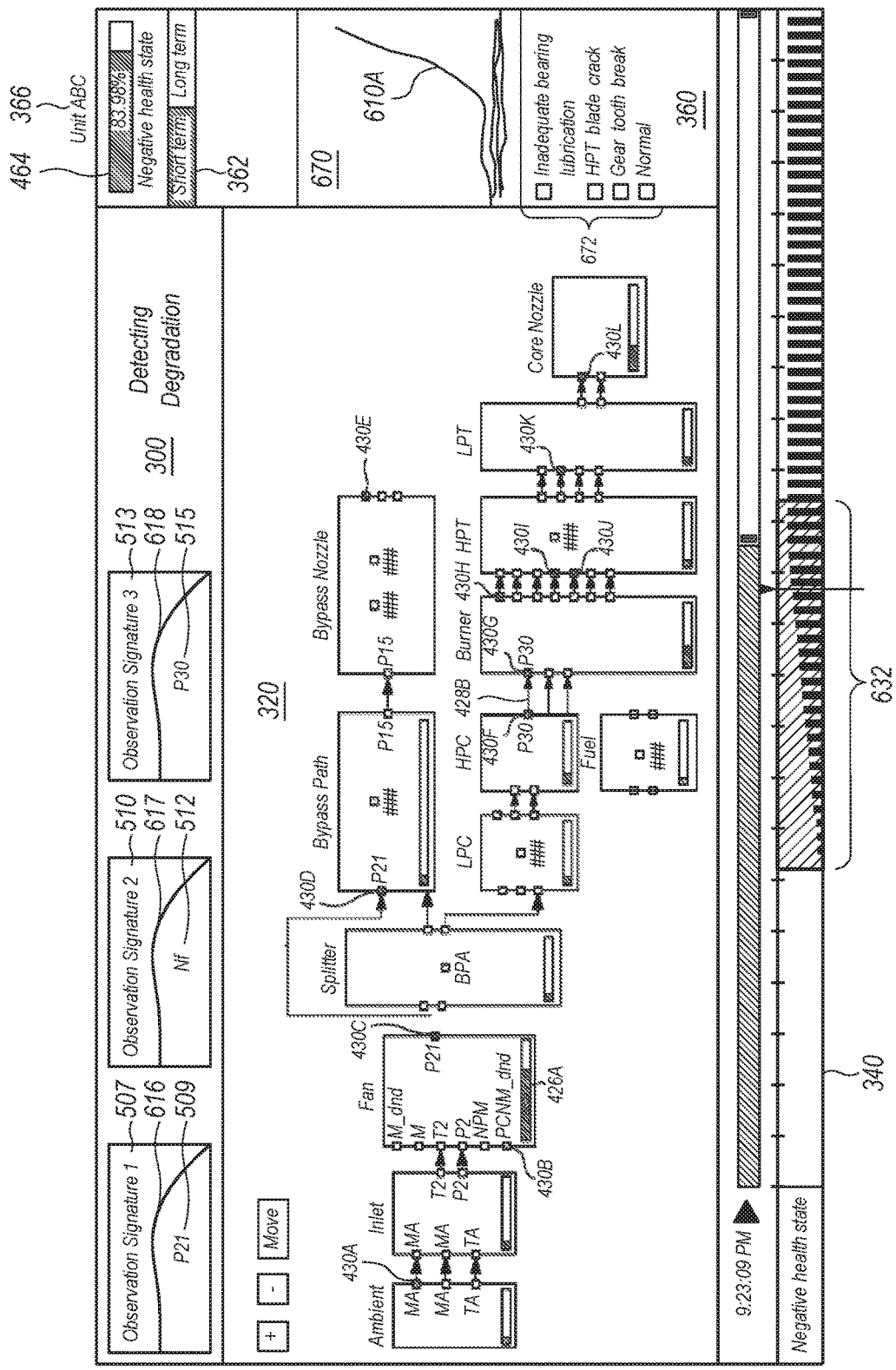

FIG. 4, FIG. 5, FIG. 6 show three example stages during playback where degradation is detected. In FIG. 4, the trackhead 450, which may be user-controlled and/or controlled by the interface manager, is moved to a point in time where the unit health became increasingly likely to be poor. This point may be evident from several changes from the nominal health state, such as the changes shown in FIG. 4. First, the health state indicator 464 in the upper right in FIG. 4 increased to 83.98% likely to be unhealthy; in the example, the bars along the timeline indicate the same.

Second, the health indicator bars 426A in the Fan and 426B in the Burner schematic components increased in red, indicating these components are likely the cause or effect of the unit unhealthiness.

Third, values 402 and 405 corresponding to domain-specific health indicators 301 and 304 shown in the top pane 300 decrease and show in red. The color of the indicators may change based on the likely health that they indicate. For example, indicators of negative health such as the ones in FIG. 4 show in red; whereas, indicators of positive health such as the ones shown in FIG. 3 shown in green.

As shown, the histogram bars 468s in the right sidebar 360 shows the four likeliest causes for the unhealthiness, with "Inadequate Bearing Lubrication" being the likeliest.

Note also that the most prominent sensors (430A, 430B, 430C, 430D, 430E, 430F, 430G, 430H, 430I, 430J, 430K, and 430L) associated with the health assessment show with red boxes (these correspond to the nonzero components of, for example, the first two eigenvectors of the unhealthy cluster's principal component analysis (PCA)). The model manager 202 may determine these causes by clustering past operating behavior, analyzing the clusters to determine which states likely lead to other states and based on which machines are physically connected to or may physically affect which other machines.

FIG. 5 shows the example GUI after receiving a selection of the user-selectable option, "Inadequate Bearing Lubrication" in the histogram bar of FIG. 4. In an embodiment, in response, the selected bar 368A turns blue and the component or components most likely associated with that unhealthiness may be highlighted in blue or shown with blue outlining 534. The remaining portion of the middle canvas 320 may turn gray, while all components that could possibly contribute to the assessment show in white. The white labeled components may show the simultaneous impact of incipient damage in the blue-label component resulting from direct physical connection or hidden interaction. The top pane 300 shows raw values 508, 511, and 514 of the prominent sensors, identified as sensors 509, 512, and 515, at the point in time indicated by the trackhead 550.

FIG. 6 shows the example GUI when a window in time 652 is selected for observation over the course of the increase in degradation. Optionally as a result of the selection, the values that previously showed as scalars in the top pane 300 now show as time series plots 616, 617, and 618. In the right pane 360, the fault attribution graph 670 shown in FIG. 6 plots the likelihood of fault for the different potential sources against time. As shown, a curve 670A in graph 670 is associated with the inadequate bearing lubrication, and the curve greatly increases over time to indicate that inadequate bearing lubrication is increasingly likely to be the cause of the fault. Right pane 360 may also include legend 672, indicating which colors, patterns, shapes, or glyphs correspond to which likely causes.

Figure 7:
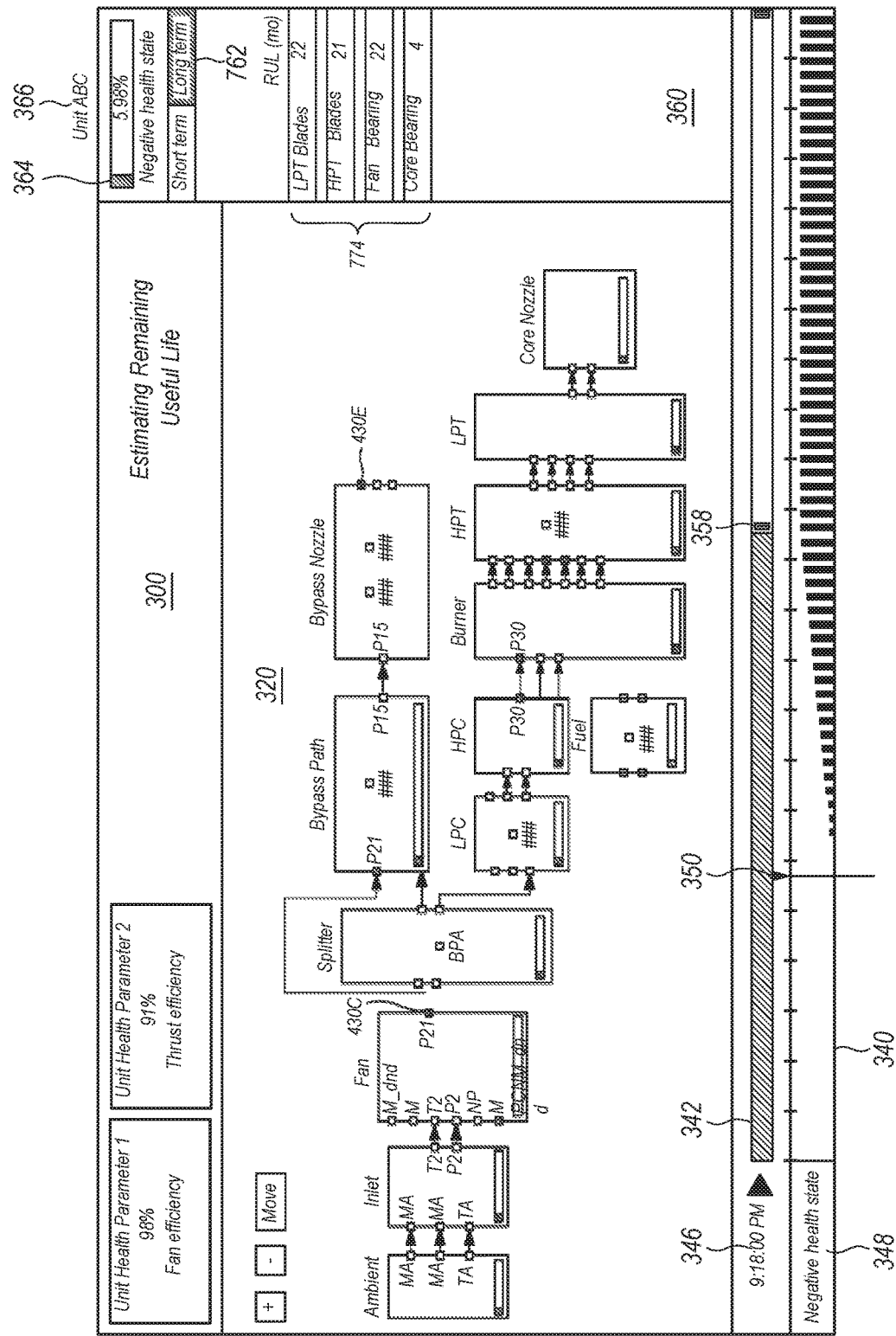
FIG. 7, FIG. 8 show a sequence of two example stages in the evaluation of a component's Remaining Useful Life (RUL) estimation.
Figure 8:
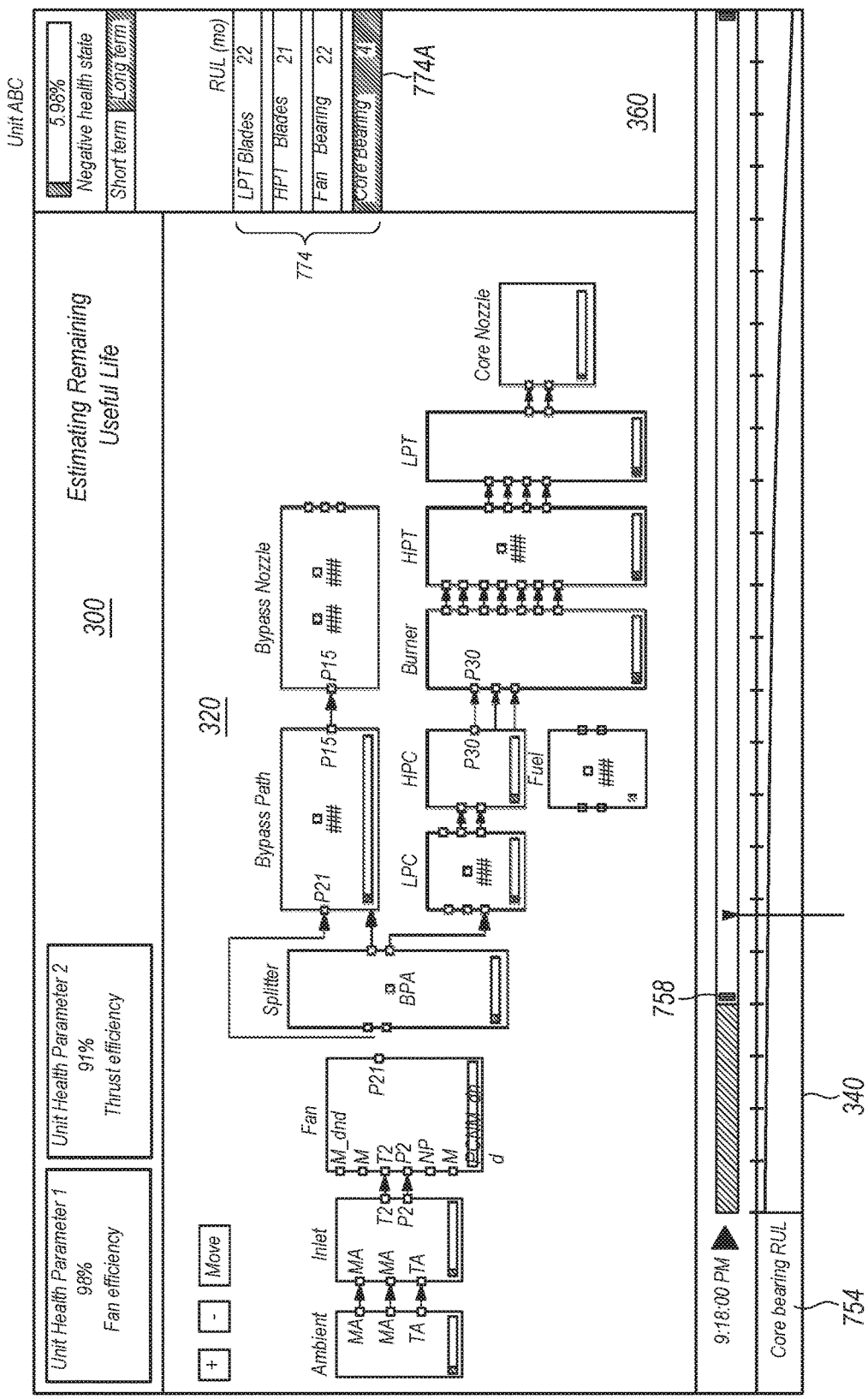

FIG. 7, FIG. 8 show a sequence of two example stages in the evaluation of a component's Remaining Useful Life (RUL) estimation. FIG. 7 shows the same degradation case as in the previous use case involving FIG. 4, FIG. 5, FIG. 6. However, the GUI in FIG. 7 may be displayed in response to selection of the "Long Term" tab 762 (rather than the "Short Term" or degradation focused tab 362, which may have been selected in the examples of FIG. 4, FIG. 5, FIG. 6). Upon selection of the "Long Term" tab 762, the right pane 360 shows a list 774 of components each with an estimate of its RUL.

FIG. 8 shows a GUI that may be displayed in response to selection of the core bearing RUL list item from FIG. 7. As shown, the selected item 774A turns blue and the bottom pane 340 changes to show a time series of the RUL 754 of this component. In an embodiment, the time zoom bar 758 also may increase in width indicating that the interface manager zoomed out in time from the time window of 24 hours to the time window of the last six months. In the example, the user or interface manager may note a change in the slope of the RUL and manually or automatically, with or without additional user input, move the track head to that change in slope point in time for further investigation.

FIG. 9, FIG. 10, FIG. 11, FIG. 12, FIG. 13 show an example GUI for detecting fault, which is similar to the example GUI for detecting degradation except that the fault may occur over a short window of time.

Figure 9:
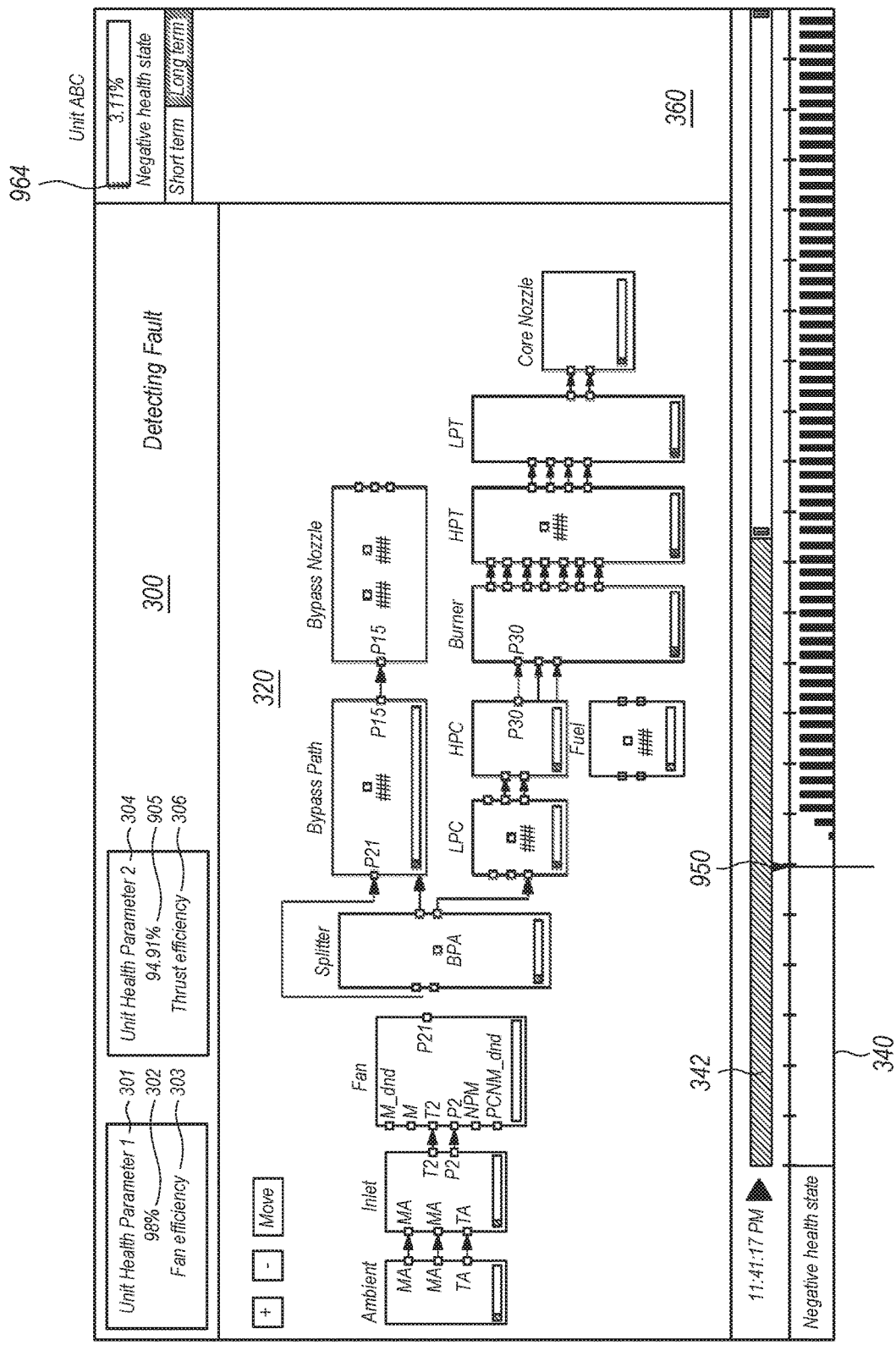
FIG. 9, FIG. 10, FIG. 11, FIG. 12, FIG. 13 show an example GUI for detecting fault.
Figure 10:
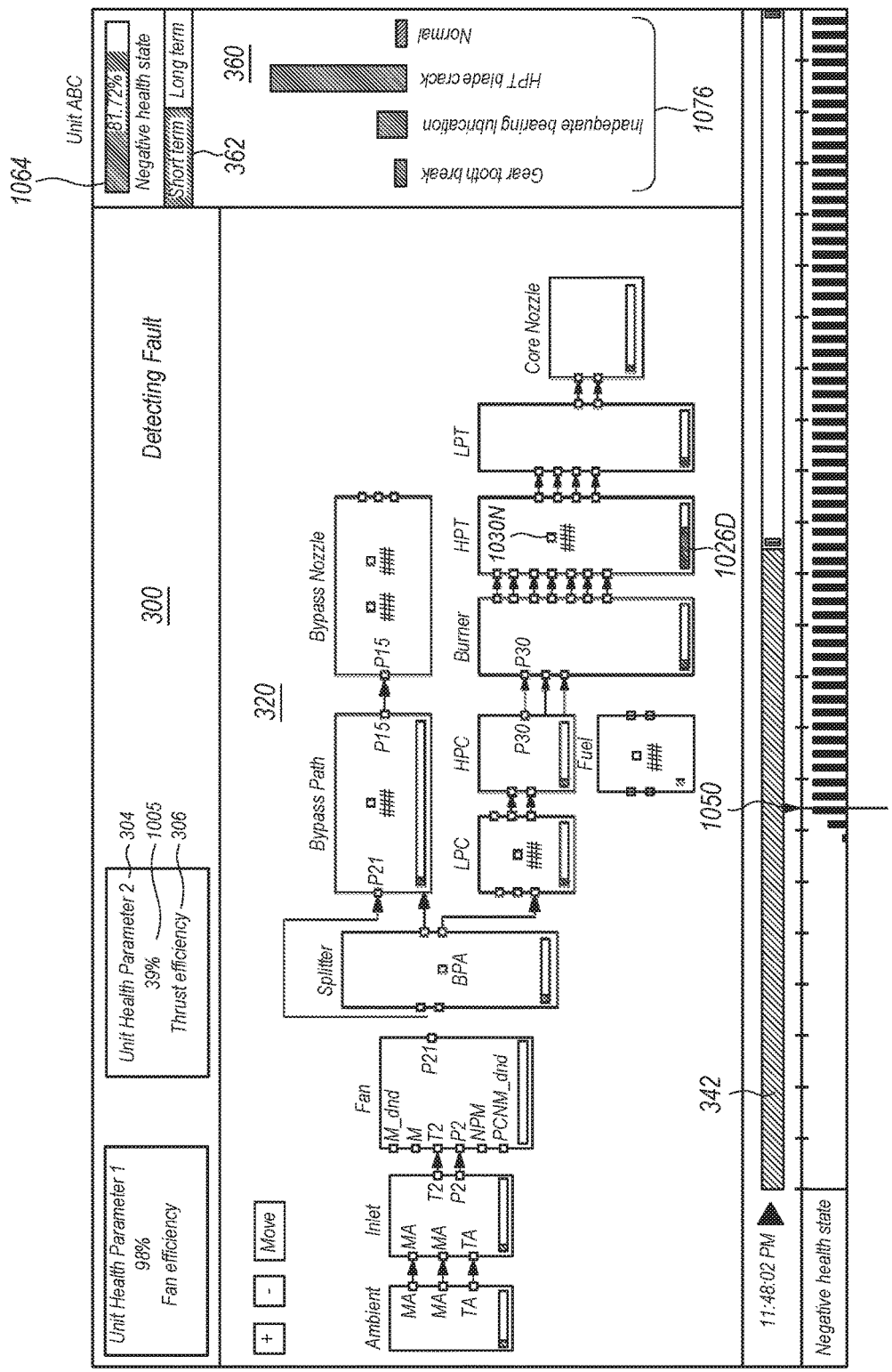

In FIG. 9, the trackhead 950 starts in a healthy portion of the movie, as indicated by positive status values 302 and 905, and a low negative health state value 964. Then, in FIG. 10, the trackhead 1050 is advanced, by the user or interface manager 200, to an unhealthy point in time. The unhealthy point is indicated by an increase in negative health state 1064 on the right pane, an increase in a negative health state indication 1026D for the high pressure turbine (HPT), and a decrease in thrust efficiency, as indicated by value 1005. The histogram 1076 in FIG. 10 shows the likeliest cause of unhealthiness is due to a HPT blade crack.

Figure 11:
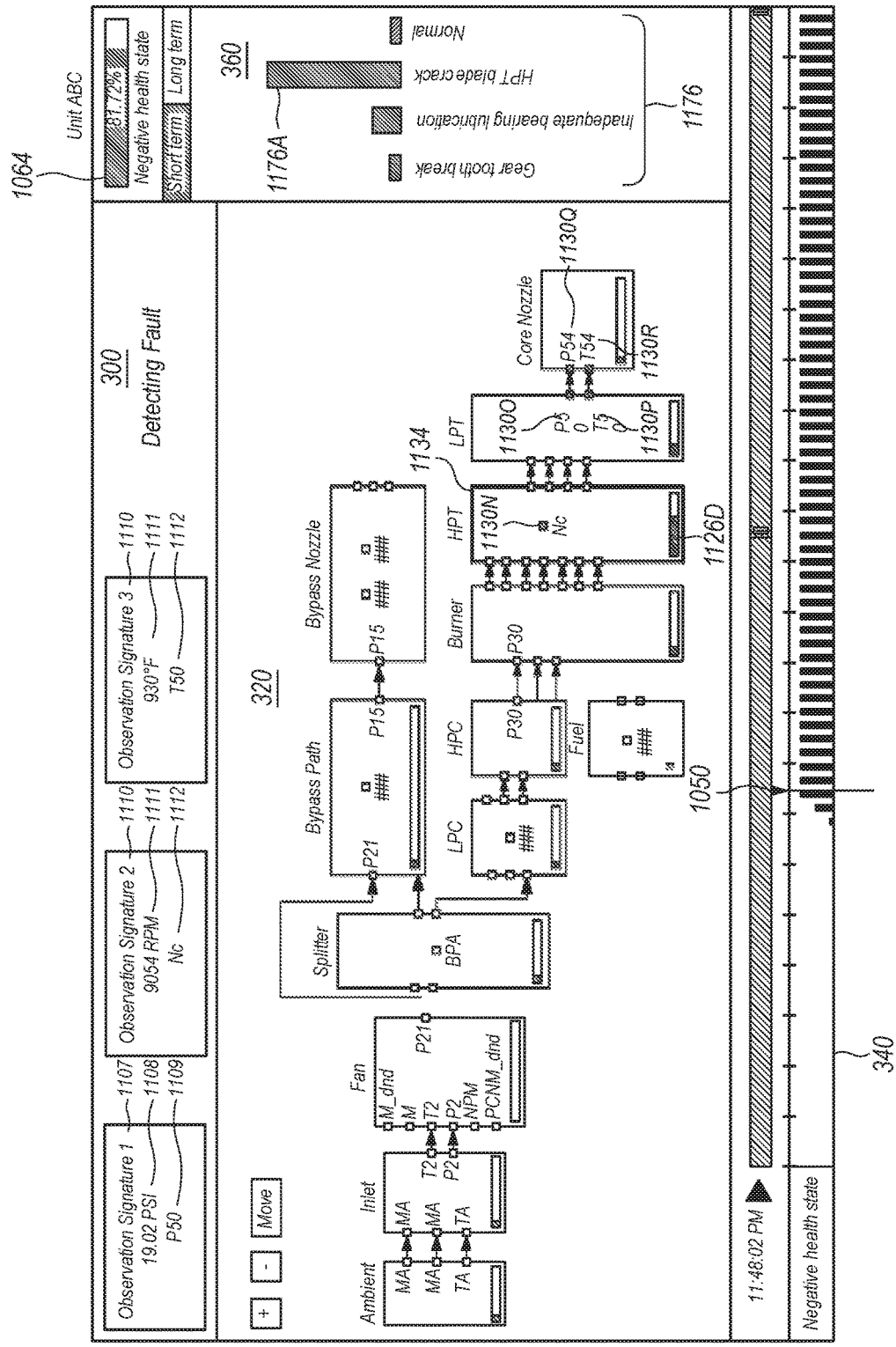

In FIG. 11, the HPT blade crack bar 1176A is highlighted, by the user or the interface manager 200, as the likely cause, and the HPT, which is the associated likely location of fault, is also highlighted in blue or given blue outlining 1134. The boxes next to Nc 1130N, P50 1130O-Q, and T50 1130 P-R sensors turn red indicating these sensors are prominent in making the assessment for the HPT blade crack, and additional information 1107-1115 is provided about the state of these sensors in the top pane, such as raw measurements 1108, 1111, and 1114.

Figure 12:
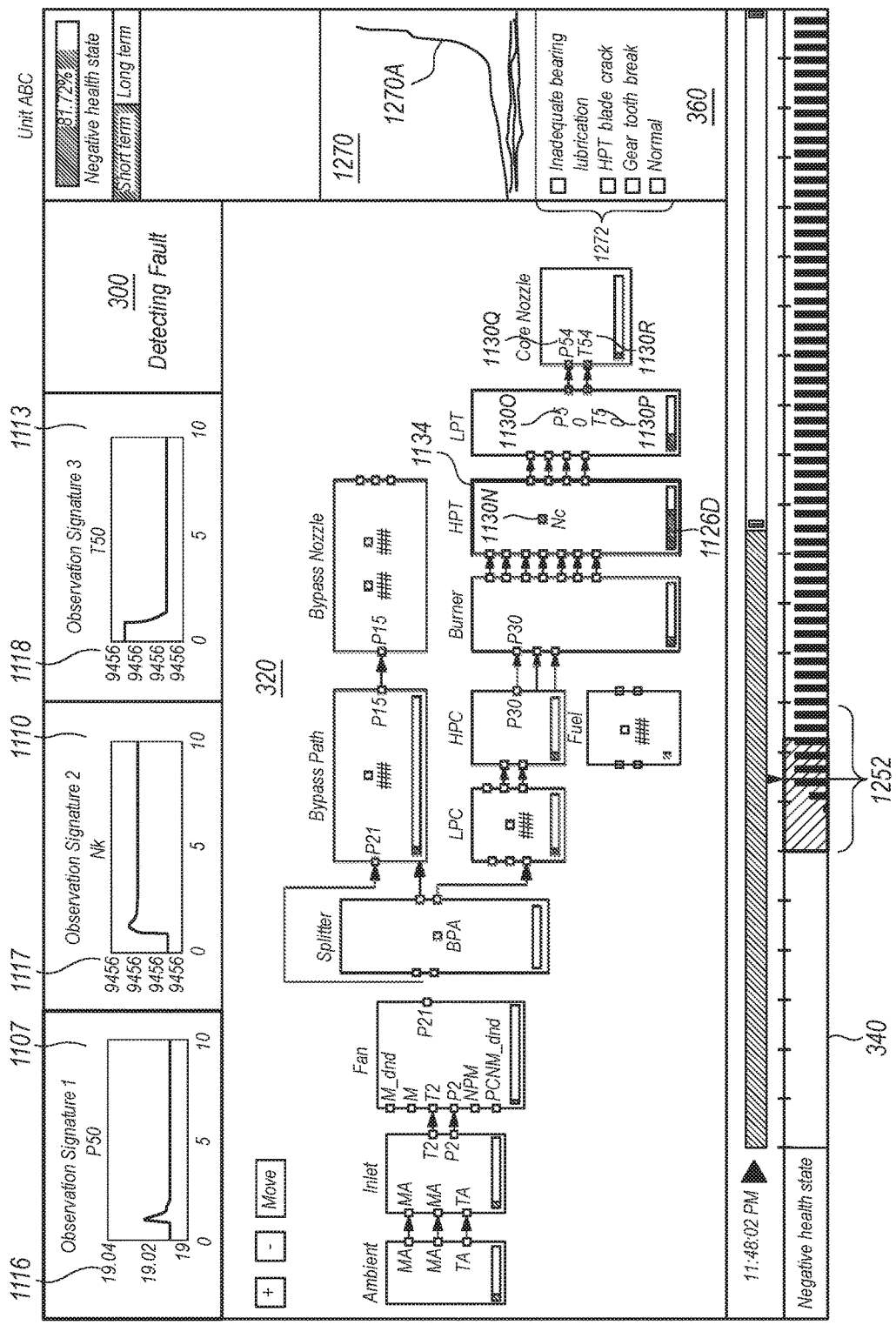

In FIG. 12, a window of time 1252 covering the fault is selected by the interface manager or the user. As shown, the fault attribution graph 1270 shows in right pane 360 and plots over time. Right pane 360 may also include legend 1272, indicating which colors, patterns, shapes, or glyphs correspond to which likely causes. As shown, a curve 1270A in graph 1270 is associated with the HPT blade crack, and the curve greatly increases over time to indicate that the HPT blade crack is increasingly likely to be the cause of the fault. Also as shown, the scalar indicators of raw sensor values in the top pane change to time series 1116, 1117, and 1118.

Figure 13:
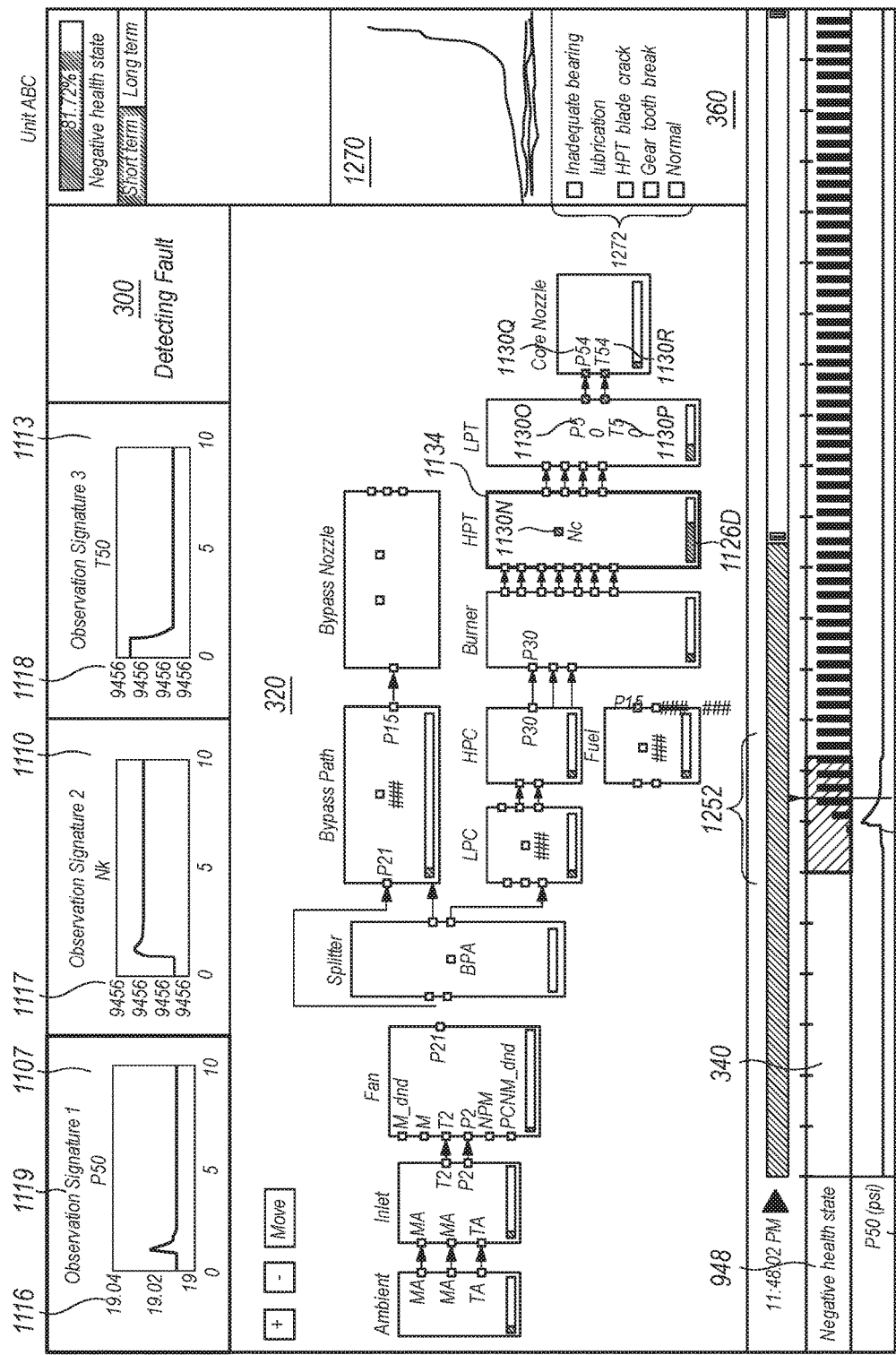

In the example of FIG. 9, FIG. 10, FIG. 11, FIG. 12, FIG. 13, a track may be added to the bottom pane as shown in FIG. 13. Added track 1359 shows the time series of the P50 sensor. As shown, time series 1359 includes a spike 1359A, which indicates a sudden increase in PSI at the corresponding time. The time series of the P50 sensor may show the user or interface manager 200 that the change in the P50 profile from flat to transient corresponds with the change in health assessment from healthy to poor. As a result, the user or interface manager 200 may suggest a remedial change to the system that relates to the P50 sensor, such as a replacement of the sensor.

Tracking

In one embodiment, the interface manager 200 causes display, on the graphical user interface, of options for tracking certain types of equipment or certain machines in a system. For example, the graphical user interface may include an option for following a particular component in a system, regardless of the relevance that the component has on a state of interest. After receiving a selection to follow the particular component, the interface manager 200 may cause display of information about that particular component along with other information that is displayed for monitoring, labeling, and prediction purposes.

Receiving Label Inputs

In one example, the interface manager 200 may receive, via the graphical user interface, input comprising a label for a set of one or more sequences of values. For example, the label input may be received from an expert upon displaying a sequence or partial sequence of values to the expert via the graphical user interface, and the label input may classify the sequence or partial sequence as known event(s) or state(s) of one or more machines. Based at least in part on the label input, the interface manager 200 may store the label in association with the set.

In one example, the interface manager 200 causes the graphical user interface to prompt for label input after or during play of a sequence of values. Via the graphical user interface, label input such as "tripping," "starting up," "operating with 60% degradation," "failing," "shutting down," "running at peak operation," or other example states may be received. In response to receiving the label input, the interface manager stores the label input in association with the sequence of values or a set or cluster of sequences of values to which the sequence has been assigned.

In one embodiment, the interface manager 200 plays state on a graphical user interface and receives labels via the interface in association with the played state. The interface manager 200 stores the labels in association with snapshots or clusters that reflect or include the played state, as a result, the clusters of operating behavior become labeled. Each item of past operating behavior in a cluster may be associated with a label assigned to one item or multiple individual items in the cluster, even if the labels were not specified for all of the items separately. Clusters may have items with multiple labels, and the labels most frequently associated with the cluster may have the highest likelihood or greatest weight for items in the cluster.

The interface manager 200 may also keep track of a likelihood that an item belongs to a particular cluster. The likelihood is determined by selecting an average pattern or average statistics for the cluster, and determining how closely the item fits with the average pattern or average statistics. Items that are very close to the center or average of their cluster have a high likelihood of belonging to that cluster, and items that are far from the center (but close enough to be considered for cluster membership) have a lower likelihood of belonging to the cluster. Accordingly, the likelihood of an item reflecting a particular state may be based on the likelihood of the item belonging to a particular cluster and the likelihood of a state label, identifying the particular state, accurately characterizing items in the particular cluster.

In one embodiment, the interface manager 200 uses a queue and pause mechanism that plays an observed event or state, which is characterized by information associated with a cluster of operating behavior. The interface manager 200 may pause between observed events and await user confirmation before skipping to a next observed event or state. As an alternative to skipping between events, the interface manager may fast forward between events and play the events at a speed that is slower than the fast forward speed. The interface manager 200 uses the queuing mechanism to present one interesting state after another interesting state to the user, where each interesting state is associated with a statistically relevant event or state.

In one embodiment, the interface manager 200 pauses display of the graphical elements before a detected event or change in state, and resumes display of the detected event at least in part by causing display of one or more changes to the one or more graphical elements that correspond to the detected event or change in state. The interface manager 200 may cause display of a prompt, via the graphical user interface, that notifies a viewer of an upcoming event or change in state. The interface manager 200 may leave the graphical elements in the paused state until receiving confirmation, via the graphical user interface, that the viewer is ready to proceed with labeling the event or change in state.

The interface manager 200 may also present a subset of fewer than all parameters for a system, optionally relating to a subset of fewer than all machines in a system for each interesting state, and the different interesting states may have different subsets of relevant parameters and relevant machines.

Upon receiving the confirmation, the interface manager 200 may cause the graphical elements to resume showing changes in faster, slower, or normal speed than the changes actually occurred in a system. After the interface manager 200 has shown one or more sequences of values that correspond to a candidate event or state, the interface manager may causing displaying a prompt for feedback. The interface manager 200 may receive, as feedback, label(s) of the candidate event or state, and the interface manager may store the label(s) in association with the played sequences of values or in association with a set or cluster to which the played sequences of values are assigned.

The interface manager 200 may speed up display of the graphical elements between events or changes in state. Before a detected event or change in state, the interface manager 200 may cause an accelerated display of minutes, hours, weeks, months, or even years of data within seconds, which is significantly faster than the speed in which the data was actually measured. Within a threshold amount of time before the detected event or change in state and/or during the detected event or change in state, the interface manager 200 may slow down the display of the changing graphical elements to real-time speed or slower, or another speed that may be faster than real-time speed but slower than the speed of the accelerated display. The interface manager 200 may also pause the display and await confirmation, which may be prompted, that the viewer is ready between the accelerated speed and the slower speed.

In one embodiment, the interface manager 200 allows multiple users or experts to provide label inputs about same or similar time sequences. The interface manager 200 may cause display, on the graphical user interface, of same or similar examples of past machine operating data, and receive label inputs that classify these examples. Conflicting label inputs may be weighed against each other, and supporting label inputs may be weighed with each other. By allowing multiple different users to provide label inputs for same or similar time sequences, the interface manager 200 facilitates conversation among the experts, improvements in best practices, and correction of mistakes.

Incorporating the Label Inputs into Machine Operating Models

The stored set of one or more sequences of values may include actual values that were observed in a system and/or aggregate or average values that are based on the observed values. The interface manager 200 may cause display of sequences of values that represent observed values, estimated values, or aggregate or average values that are based on observed values.

The interface manager 200 may receive, via user input, a label to be assigned to a displayed sequence of values. The label may be stored in association with the displayed sequence of values and/or in association with a set of sequences of values that includes, in addition to the displayed sequence of values, at least some sequences of values are similar to the displayed sequence of values but that were not themselves displayed to the expert or labeled. If the label input is stored in association with the set, the model manager 202 may apply labels to similar patterns of operating behavior even though the similar patterns might not have been labeled by human users. The model manager 202 may also use the label input to classify events as positive events or negative events, and to make more accurate predictions regarding future operating behavior of the machines.

In one embodiment, the model manager 202 analyzes the label inputs received for two or more sets of sequences of values that are classified in a particular cluster of the one or more clusters of operating behavior. The label inputs may have been received from the same user or source or from at least two different users or sources. The particular cluster may have been determined by clustering similar operating behavior with or without the benefit of any label input. Based at least in part on the label inputs, the label may be assigned to the particular cluster even after the particular cluster was created. In other words, the cluster may initially be created based on observed patterns in the data but without a label, and the label may be associated with the existing cluster.

In one example, the interface manager may receive, from at least two different users, conflicting label inputs for the set of sequences of values that are classified in the same cluster of operating behavior. Based at least in part on the conflicting label inputs, the model manager 202 may assign one or more labels to the set, each with a corresponding degree of likelihood that is stored in association with the label-set assignment. A greater amount of conflict among label inputs may decrease the likelihood that any of the label inputs is accurate, and a lower amount of conflict among the label inputs may increase the likelihood that any of the label inputs is accurate.

In one embodiment, the interface manager 200 gathers a variety of label inputs that describe a particular state such as a fault or a trip, and applies these inputs to estimate unknown states such as those belonging to clusters that have not yet been labeled. For example, a new cluster may be estimated to be similar to an existing cluster, even though the new cluster involves a set of machines that has little known commonality with previously labeled machines. In this manner, labels associated with states for one type of machines may be extended to another type of machines based on common characteristics of the machines and/or similarities in patterns.

Using the Machine Operating Models to Estimate or Predict States

Once the labels and past operating data have been incorporated into the machine operating models, the machine operating models may be used estimate current machine operating states or predict future operating behavior in terms that have been defined by the experts. For example, instead of showing a future expected state in terms of a sequence of values, the interface manager may show the future expected state with the appropriate label.

In one embodiment, the estimations or predictions may be evaluated, used, and optionally corrected or confirmed on the basis of past behavior or predicted future behavior. For example, a user may be classifying behavior based on data from another plant, and some of the data may be past data while other data may be future predicted data. The interface manager may collect label input from the user from either or both, optionally without the user knowing whether the input is used to make live decisions, classify historical data, or simulate future behavior.

Periodically Updating the Machine Operating Models

In addition to using labels and past operating data for diagnostic purposes, the model manager 202 may continuously update the models based on updated labels and updated operating data. The updated operating data may include machine operating measurements that have been obtained from sensors on machines since the models were last generated or updated. In one example, the model manager 202 may re-compute the machine operating models based on the set of past operating data as a whole after the operating data is updated. Alternatively, the model manager 202 may add patterns to the machine operating models based on the updated operating data without re-computing the machine operating models as a whole.

The information displayed by the graphical user interface when playing state may become better and more detailed over time. Past predictions and past labels may be used to estimate and identify states of machines in the system, and future users may see the states and corresponding labels as already provided and confirm predictions/estimations or label new unknown states. For example, a graphical user interface may receive a label for a low-level state and later use this label when playing a high-level state. For example, a user may name the label as a trip and/or indicate that the state has negative consequences on the system. Based on this information, the interface manager 200 may color a machine experiencing this state as red or even provide the label or an icon associated with the label on the machine. In the example, a "trip" icon may appear in yellow or red on the machine while the machine is experiencing a trip.

Machine Health Management System

The interface manager 200 and/or the model manager 202 may be centralized on one computing device, a cluster of computing devices, or a single cloud, or distributed over multiple computing devices, multiple clusters, or multiple clouds. By continuously or periodically updating the estimations or predictions and continuously or periodically updating the machine operating models, the interface manager 200 and model manager 202 cooperate to provide an adaptive machine health management system that reacts to changing conditions in the system of machines and in the environment surrounding the system and characterizes those conditions in terms that are already understood by experts. Static machine management solutions, unlike the dynamic solution, cannot account for dynamic changing conditions that are specific to a system or to the environment surrounding the system and do not allow experts to label familiar operating behaviors.

In various examples, a machine health management system may detect deviation from expected behavior of a system, unit, component, sensor, or other machine element, and estimate future state of that element by attributing the deviation to degradation, misuse of the element, a trip of the element, or some other historical state that is known to have produced similar measurements in the past. The state of multiple elements may be estimated and learned from to identify dynamics of hidden degradations and/or faults and how these hidden degradations and/or faults affect different elements.

The interface manager 200 may predict a wear on a component will result from highly abnormal values. In a particular example, a ball bearing may wear as a result of a hot temperature reading. In the example, debris accumulating on a turbine section may result in oxidation because of the chemical interaction with the debris, which will result in reduced RPM of the turbine blade. The reduced RPM of the turbine blade may cause compensating action to increase, thereby increasing the heat rate to maintain the same power level. By increasing the compensating action, the system may increase the wear on the bearing because the system is attempting to move the turbine section faster to produce the power.

In the example, if the interface manager 200 determines, based on the causality of connected states, that there is debris on a turbine section, then the interface manager 200 may predict what the next impact will be and how far away that impact will be in the future. In the example, the interface manager 200 may be playing current or recent states and then jump to a state a year in the future where components are predicted to start to fail due to the debris.

Reactions to State Estimations or Predictions

As the interface manager 200 causes display of a variety of information to the user, the user may make a variety of possible decisions in light of the information. For example, upon receiving information that a system has a certain amount of progress in a state of long-term degradation, the user could allow system to run to 20% degradation or 40% degradation or more before taking corrective, preventative, or remedial action. In fact, the user might not take any action at all with respect to a negative state. The user, who may be a maintenance engineer or other expert, may take a variety of factors into account, such as past experience, the machine specifications, the costs of fixing the problem, and/or the risks of not fixing the problem. could take no action, preventative action, or remedial action.

In one embodiment, the interface manager 200 suggests actions based on the nature of the problem and/or logs of actions that were taken and successful at eliminating or reducing the problem in the past, leading to better overall states. For example, the interface manager 200 may suggest replacing components that have experienced above a threshold amount of degradation, or adding fluids to tanks that are running low on fluids. The interface manager 200 may optimize suggestions to reach better states, which may be characterized as normal or peak operating states, operation within a range of expected values, or may be specified in terms of economic efficiency of the system or individual machines. Such efficiency may be tracked over time. Alternatively, better states may be characterized as states where machines at a certain level are operating without significant negative warnings or negative sub-states.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
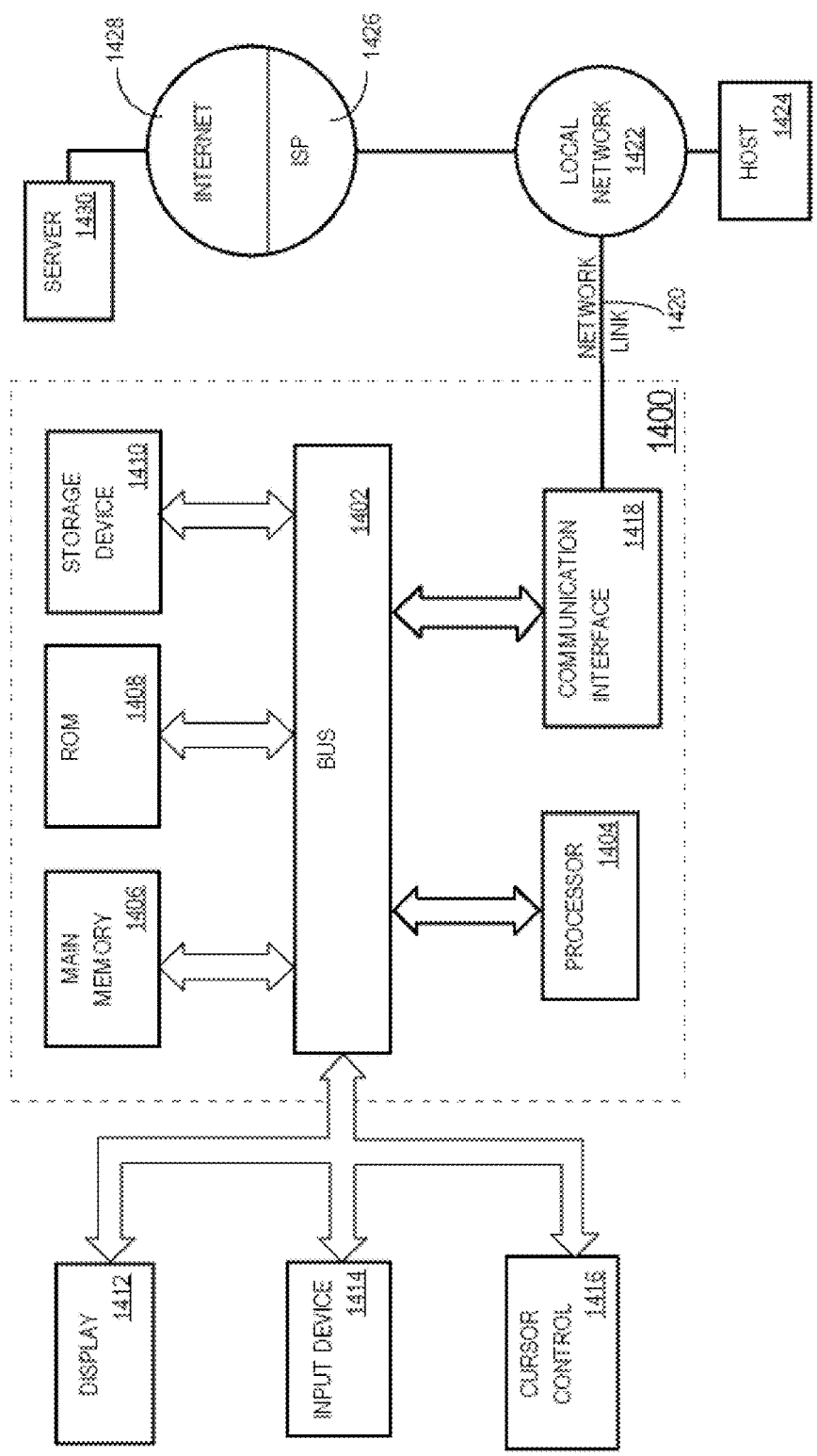
FIG. 14 illustrates an example computer system that may be configured to implement, individually or in cooperation with other computer systems, various technical steps described herein.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or solid-state drive is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   using a computing device, receiving a set of one or more sequences of values that describe operating behavior of one or more machines that were observed over one or more windows of time,
   classifying the set of one or more sequences of values into one or more clusters,
   wherein at least one sequence of values of the set of one or more sequences of values change as the one or more machines operate over time,
   wherein the at least one sequence of values is classified in the one cluster;
   using the computing device, causing display, on a display device, of one or more graphical elements that change in appearance over time according to the at least one sequence of values,
   at least one of the one or more graphical elements representing a characteristic of a part of the one or more machines,
   the at least one of the one or more graphical elements changing in appearance at least in a color or a size;
   detecting an upcoming occurrence of an event based on the at least one sequence of values;
   in response to detecting the upcoming occurrence of the event and prior to the event, causing display of the at least one of the one or more graphical elements to change in appearance at least in the color or the size in a slower speed or a faster speed;

after display corresponding to the event, causing display of a prompt for feedback;

using the computing device, receiving, via the prompt for feedback, input comprising a label for the at least one sequence of values, and, based at least in part on the input, storing the label in association with the at least one sequence;

analyzing input received for the at least one sequence of values and other sequences of the set of one or more sequences of values that are classified in the one cluster;

based at least in part on the analyzing, assigning the label to the one cluster;

causing display of the label in association with displaying further changes in the appearance of the one or more graphical elements according to any sequence that is classified in the one cluster.

2. The method of claim 1, comprising causing display of graphical representations, wherein each graphical representation of the graphical representations represents a particular machine in a system, and wherein the graphical representations are displayed concurrently with the one or more graphical elements.

3. The method of claim 1, comprising causing changing in appearance of the one or more graphical elements over time at least in part by changing a color of the one or more graphical elements.

4. The method of claim 1, comprising causing changing in appearance of the one or more graphical elements over time at least in part by changing a size of the one or more graphical elements.

5. The method of claim 1,
wherein causing display of the one or more graphical elements comprises playing a time series of measurements and the method further comprises pausing display of the time series of measurements before a detected event, and resuming causing display of the time series of measurements by causing display of one or more changes to the one or more graphical elements that correspond to the detected event.

6. The method of claim 1, comprising speeding up display of the one or more graphical elements before a detected event, and slowing down display of the one or more graphical elements during the detected event.

7. The method of claim 1, comprising
receiving, from at least two different sources, conflicting label inputs for the set of one or more sequences of values;

based at least in part on the conflicting label inputs, assigning the label to the set of one or more sequences of values with a corresponding degree of likelihood.

8. The method of claim 1, comprising causing changing the display of the one or more graphical elements in appearance over time according to the at least one sequence of values including showing traversal of a negative status from a first machine to one or more other machines that are physically connected to the first machine.

9. One or more non-transitory computer-readable storage media storing instructions which, when executed, cause performance of:

using a computing device, receiving a set of one or more sequences of values that describe operating behavior of one or more machines that were observed over one or more windows of time, classifying the set of one or more sequences of values into one or more clusters, wherein at least one sequence of values of the set of one or more sequences of values change as the one or more machines operate over time;

wherein the at least one sequence of values is classified in the one cluster;

using the computing device, causing display, on a display device, of one or more graphical elements that change in appearance over time according to the at least one sequence of values, at least one of the one or more graphical elements representing a characteristic of a part of the one or more machines, the at least one of the one or more graphical elements changing in appearance at least in a color or a size;

detecting an upcoming occurrence of an event based on the at least one sequence of values;

in response to detecting the upcoming occurrence of the event and prior to the event, causing display of the at least one of the one or more graphical elements to change in appearance at least in the color or the size in a slower speed or a faster speed;

after display corresponding to the event, causing display of a prompt for feedback;

using the computing device, receiving, via the prompt for feedback, input comprising a label for the at least one sequence of values, and, based at least in part on the input, storing the label in association with the at least one sequence;

analyzing the input received for the at least one sequence of values and other sequences of the set of one or more sequences of values that are classified in the one cluster;

based at least in part on the analyzing, assigning the label to the one cluster;

displaying the label in association with displaying further changes in the appearance of the one or more graphical elements according to any sequence that is classified in the one cluster.

10. The non-transitory computer-readable storage media of claim 9, comprising instructions which when executed cause performing: causing display of graphical representations, wherein each graphical representation of the graphical representations represents a particular machine in a system, and wherein the graphical representations are displayed concurrently with the one or more graphical elements.

11. The non-transitory computer-readable storage media of claim 9, comprising instructions which when executed cause performing: causing changing in appearance of the one or more graphical elements over time at least in part by changing a color of the one or more graphical elements.

12. The non-transitory computer-readable storage media of claim 9, comprising instructions which when executed cause performing: causing changing in appearance of the one or more graphical elements over time at least in part by changing a size of the one or more graphical elements.

13. The non-transitory computer-readable storage media of claim 9, wherein causing display of the one or more graphical elements comprises playing a time series of measurements and the instructions which when executed cause further performance of: pausing display of the time series of measurements before a detected event, and resuming causing display of the time series of measurements by causing display of one or more changes to the one or more graphical elements that correspond to the detected event.

14. The non-transitory computer-readable storage media of claim 9, comprising instructions which when executed cause performing: speeding up display of the one or more graphical elements before a detected event, and slowing down display of the one or more graphical elements during the detected event.

15. The non-transitory computer-readable storage media of claim 9, comprising instructions which when executed cause performing:
   receiving, from at least two different sources, conflicting label inputs for the set of one or more sequences of values;
   based at least in part on the conflicting label inputs, assigning the label to the set of one or more sequences of values with a corresponding degree of likelihood.

16. The non-transitory computer-readable storage media of claim 9, comprising instructions which when executed cause performing: changing the display of the one or more graphical elements in appearance over time according to the at least one sequence of values including showing traversal of a negative status from a first machine to one or more other machines that are physically connected to the first machine.

17. The method of claim 1, further comprising:
   detecting an upcoming occurrence of a second event;
   causing display of a specific label associated with the second event before the occurrence of the second event.

18. The non-transitory computer-readable storage media of claim 9, further comprising:
   detecting an upcoming occurrence of a second event;
   causing display of a specific label associated with the second event before the occurrence of the second event.

19. The method of claim 1,
   the one or more graphical elements including a colored box, a shape, a line, a line thicknesses, a glyph, a sound, an icon, or a point along an axis of a graph.

20. The non-transitory computer-readable storage media of claim 9,
   the one or more graphical elements including a colored box, a shape, a line, a line thicknesses, a glyph, a sound, an icon, or a point along an axis of a graph.

* * * * *